US008134362B1

(12) United States Patent
Hullender et al.

(10) Patent No.: US 8,134,362 B1
(45) Date of Patent: Mar. 13, 2012

(54) SYSTEM AND METHOD FOR RECORDING AND MONITORING DIRECTIVES FOR VEHICLES SUCH AS AIRPLANES

(75) Inventors: Chad Hullender, Arlington, TX (US); James T. Diamond, Grapevine, TX (US); Arunprakash Dhanabal, Irving, TX (US); Hyder Alkasimi, Flower Mound, TX (US); John Molitor, Waxahachie, TX (US)

(73) Assignee: American Airlines, Inc., Fort Worth, TX (US)

( * ) Notice: Subject to any disclaimer, the term of this patent is extended or adjusted under 35 U.S.C. 154(b) by 85 days.

(21) Appl. No.: 12/815,614

(22) Filed: Jun. 15, 2010

(51) Int. Cl.
*G01V 3/00* (2006.01)

(52) U.S. Cl. ........................................................ 324/300

(58) Field of Classification Search .......... 324/300–322; 705/5; 701/200, 201; 370/254, 238, 255; 340/995, 988, 990; 250/221
See application file for complete search history.

(56) References Cited

U.S. PATENT DOCUMENTS

| | | | | |
|---|---|---|---|---|
| 8,027,273 B2* | 9/2011 | Nguyen | ........................ | 370/254 |
| 2008/0100704 A1* | 5/2008 | Venetianer et al. | ........... | 348/143 |
| 2009/0210262 A1* | 8/2009 | Rines et al. | ....................... | 705/5 |
| 2010/0175006 A1* | 7/2010 | Li | ................................ | 715/764 |

* cited by examiner

*Primary Examiner* — Brij Shrivastav
(74) *Attorney, Agent, or Firm* — Haynes and Boone, LLP

(57) ABSTRACT

A system and method for recording and monitoring directives for vehicles, such as airplanes, according to which directives for the airplanes are recorded and monitored to thereby provide a situational awareness of, for example, a predetermined area of an airport with respect to the airplanes and the movement thereof into, within and/or out of the predetermined area of the airport.

22 Claims, 13 Drawing Sheets

SYSTEM AND METHOD FOR RECORDING AND MONITORING DIRECTIVES FOR VEHICLES SUCH AS AIRPLANES

BACKGROUND

The present disclosure relates in general to recording and monitoring directives for vehicles such as airplanes, and in particular to a system and method for recording and monitoring directives for vehicles, such as airplanes, to thereby provide a situational awareness of a predetermined area with respect to the vehicles and the movement thereof into, within and/or out of the predetermined area.

DETAILED DESCRIPTION

Figure 1:
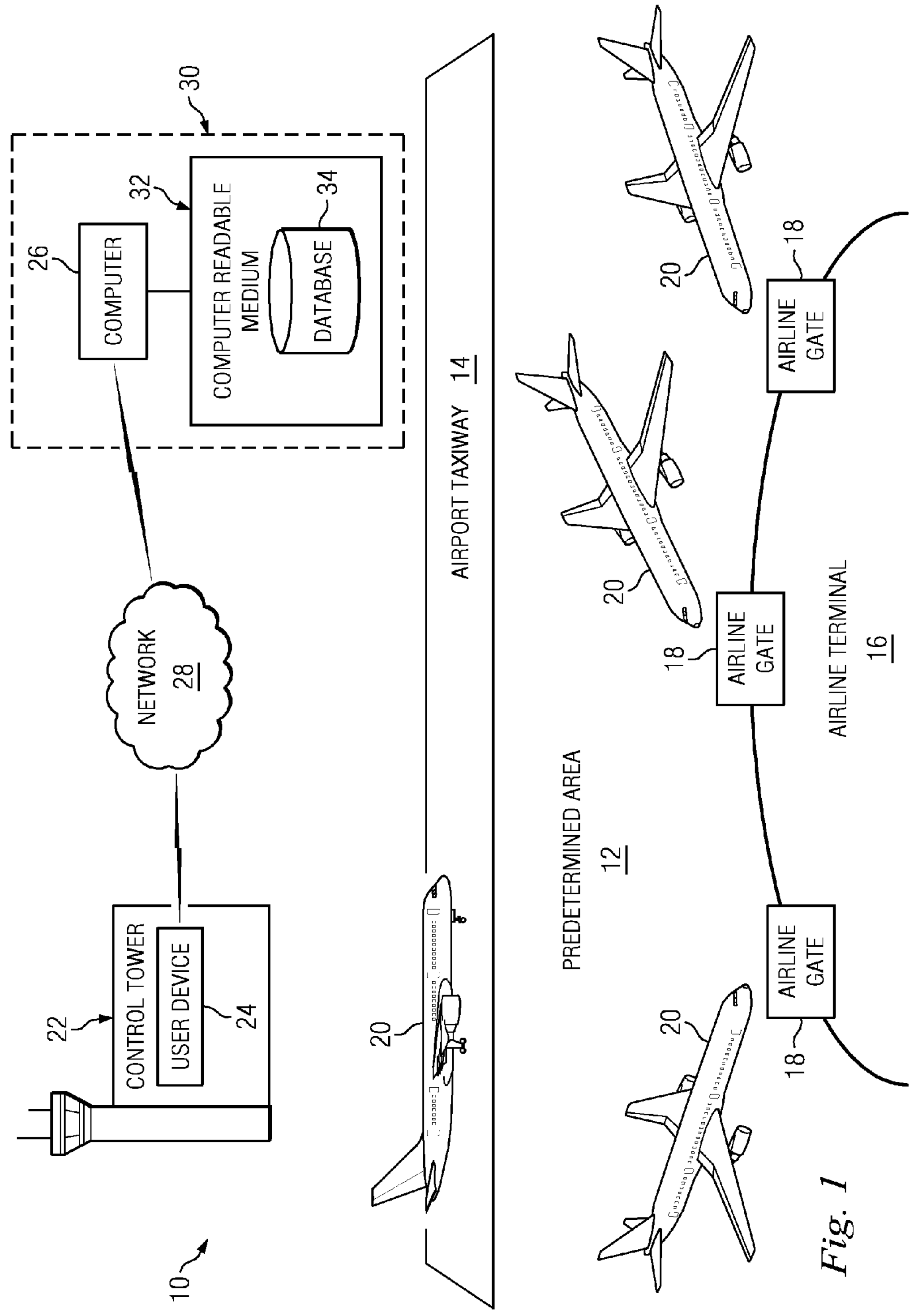
FIG. 1 is a diagrammatic illustration of a system according to an exemplary embodiment, the system including a user device located at a control tower.

In an exemplary embodiment, as illustrated in FIG. 1, a system is generally referred to by the reference numeral 10 and includes a predetermined area 12 of an airport. The predetermined area 12 is partially defined by an airport taxiway 14 and an airline terminal 16. The airport taxiway 14 includes one or more taxiways, which provide paths that connect the airline terminal 16 with runways, hangars, terminals, other facilities, etc. (not shown). The airline terminal 16 includes a plurality of airline gates 18, at which one or more airplanes 20 arrive and from which the airplanes 20 depart. The airplanes 20 travel to and/or from the airline terminal 16 via the airport taxiway 14. As shown in FIG. 1, the predetermined 12 extends between, and is bounded by, the airport taxiway 14 and the airline terminal 16. In several exemplary embodiments, instead of, or in addition to, the airport taxiway 14 and/or the airline terminal 16, the predetermined area 12 may be defined by additional areas and/or structures such as, for example, one or more additional airline terminals.

The system 10 further includes a control tower 22 at which a user device 24 is located. In an exemplary embodiment, the control tower 22 is located at or otherwise part of the airport in which the predetermined 12 is defined. In an exemplary embodiment, the control tower 22 is located at or otherwise part of the airport in which the predetermined area 12 is defined, and the control tower 22 overlooks the predetermined 12. In an exemplary embodiment, the control tower 22 is located at an airport other than where the area 12 is defined.

The user device 24 that is located at the control tower 22 is operably coupled to, and in two-way communication with, a computer 26 via a network 28. The computer 26 is part of a module 30, which further includes a computer readable medium 32 that is operably coupled to the computer 26. Instructions accessible to, and executable by, the computer 26 are stored in the computer readable medium 32. A database 34 is also stored in the computer readable medium 32. In several exemplary embodiments, the network 28 includes the Internet, one or more local area networks, one or more wide area networks, one or more wireless networks, one or more voice networks, one or more data networks, and/or any combination thereof.

In several exemplary embodiments, the module 30 and/or one or more components thereof, including one or more of the computer 26, the computer readable medium 32, content stored in the computer readable medium 32, the database 34, content stored in the database 34, and/or any combination thereof, are part of, and/or are distributed throughout, the system 10 and/or one or more components thereof, including one or more of the user device 24, the control tower 22, the airplanes 20, the airline gates 18, the airline terminal 16, and/or any combination thereof. In an exemplary embodiment, the computer 26 is a web application server. In an exemplary embodiment, the module 30 is, includes, or is at least a part of, a web-based program, an Intranet-based program, and/or any combination thereof.

In several exemplary embodiments, the module 30 and/or one or more components thereof, including one or more of the computer 26, the computer readable medium 32, content stored in the computer readable medium 32, the database 34, content stored in the database 34, and/or any combination thereof, is, is part of, includes, is operably coupled to, and/or is in two-way communication with, an airline operational data source and forecasting engine, which provides automatic data collection and management functionality, thereby collecting and storing real-time airline flight data from multiple sources and providing integrated data forecasts to the module 30, with such airline flight data including one or more of the following: scheduled airline flight departure times, scheduled airline flight arrival times, estimated airline flight departure times, estimated airline flight arrival times, actual airline flight departure times, actual airline flight arrival times, latest published flight times and statuses, latest gate assignments, aircraft rotations, crew sequence information, passenger counts and connections, baggage counts and connections, crew legality information, curfew information, and slot restrictions. In several exemplary embodiments, the module 30 and/or one or more components thereof, including one or more of the computer 26, the computer readable medium 32, content stored in the computer readable medium 32, the database 34, content stored in the database 34, and/or any combination thereof, is, is part of, includes, is operably coupled to, and/or is in two-way communication with, the airline operational data source and forecasting engine that is disclosed in U.S. patent application Ser. No. 12/683,984, filed Jan. 7, 2010, the entire disclosure of which is incorporated herein by reference.

In several exemplary embodiments, instead of, or in addition to an airline operational data source and forecasting engine, the module 30 and/or one or more components thereof, including one or more of the computer 26, the computer readable medium 32, content stored in the computer readable medium 32, the database 34, content stored in the database 34, and/or any combination thereof, is, is part of, includes, is operably coupled to, and/or is in two-way communication with, a dispatch environmental control system (DECS) and/or one or more computer systems, host-based systems and/or applications thereof; an enhanced reservation system (RES) and/or one or more computer systems, host-based systems and/or applications thereof; the Federal Aviation Administration (FAA) and/or one or more computer systems, host-based systems and/or applications thereof; off-schedule operations (OSO) and/or one or more computer systems, host-based systems and/or applications thereof; the selected station; one or more other stations; a flight operating system (FOS) and/or one or more computer systems, host-based systems and/or applications thereof; and an aircraft communication addressing and reporting system (ACARS) and/or one or more computer systems, host-based systems and/or applications thereof.

Figure 2:
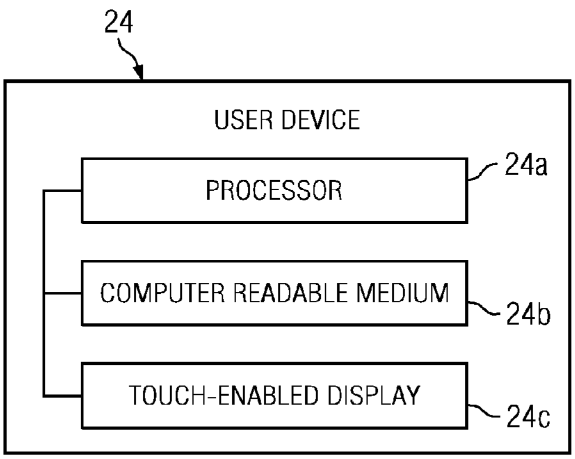
FIG. 2 is a diagrammatic illustration of the user device of FIG. 1, according to an exemplary embodiment.

In an exemplary embodiment, as illustrated in FIG. 2 with continuing reference to FIG. 1, the user device 24 includes a processor 24*a*, a computer readable medium 24*b*, and a touch-enabled display 24*c*. In an exemplary embodiment, instructions accessible to, and executable by, the processor 24*a* are stored in the computer readable medium 24*b*. In an exemplary embodiment, the touch-enabled display 24*c* is a combined input/output device that permits multi-touch interaction between the user device 24 and the operator or user thereof, such as an airplane traffic planner employed by, for example, an airline that operates the airplanes 20. In several exemplary embodiments, instead of, or in addition to, the touch-enabled display 24*c*, the user device 24 includes another input device, such as a keyboard, a mouse, a PIN pad, a scanner, a card reader, and/or any combination thereof, and/or includes another output device, such as a digital display, a liquid crystal display, another type of graphical display, a cathode ray tube monitor, a printer, a plotter, and/or any combination thereof.

Figure 3:
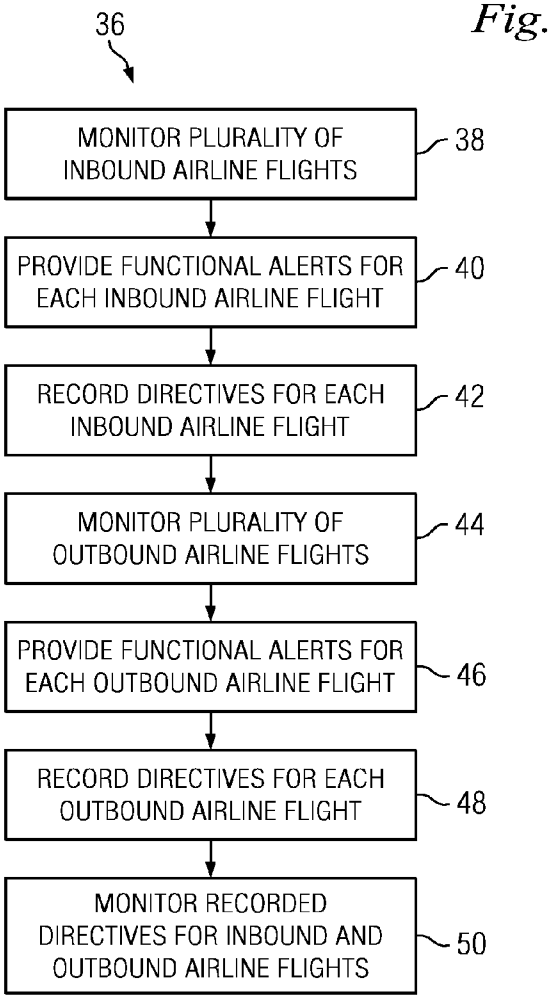
FIG. 3 is a flow chart illustration of a method of operating the system of FIG. 1, according to an exemplary embodiment.

In an exemplary embodiment, as illustrated in FIG. 3 with continuing reference to FIGS. 1 and 2, a method of operating the system 10 is generally referred to by the reference numeral 36. In several exemplary embodiments, the method 36 is implemented in whole or in part by the user device 24, the module 30, and/or any combination thereof.

As shown in FIG. 3, the method 36 includes monitoring a plurality of inbound airline flights in step 38, with each of the inbound airline flights using an airplane 20 that is expected to be moved into and be positioned within the predetermined area 12 at some point in time in the future, that is, expected to stop at one of the gates 18 of the airline terminal 16. Functional alerts are provided for each of the inbound airline flights in step 40, and directives for each of the inbound airline flights are recorded in step 42. A plurality of outbound airline flights are monitored in step 44, with each of the outbound airline flights using an airplane 20 that is positioned within the predetermined area 12, that is, stopped at one of the gates 18 of the airline terminal 16, but is expected to move out of the predetermined area 12 and onto the airport taxiway 14 at some point in time in the future. Functional alerts for each of the outbound airline flights are provided in step 46, and directives for each of the outbound flights are recorded in step 48. The recorded directives for the inbound and outbound airline flights are monitored in step 50. In several exemplary embodiments, the steps 38, 40, 42, 44, 46, 48 and 50 of the method 36 are combined, and/or are performed in different orders, simultaneously, sequentially and/or any combination thereof.

As will be described in further detail below, by executing the method 36, a situational awareness of the status of the predetermined area 12 with respect to all of the airplanes 20 used by the inbound and outbound airline flights is provided to a user or operator of the user device 24. For the following detailed description of the exemplary embodiment of the method 36, the user or operator of the user device 24 will be referred to as a “traffic planner,” a person who plans, coordinates and/or manages the traffic and thus the movement of one or more of the airplanes 20 into, within and/or out of the predetermined area 12, by giving spoken directives to the respective crews operating the airplanes 20. The traffic planner provides such spoken directives from the control tower 22 at which the user device 24 is located. In several exemplary embodiments, instead of, or in addition to spoken directives, other types of directives are given such as, for example, computer-executed directives, symbol directives, code directives, alerts, sounds, visual directives, audio directives, multimedia directives, etc.

Figure 4:
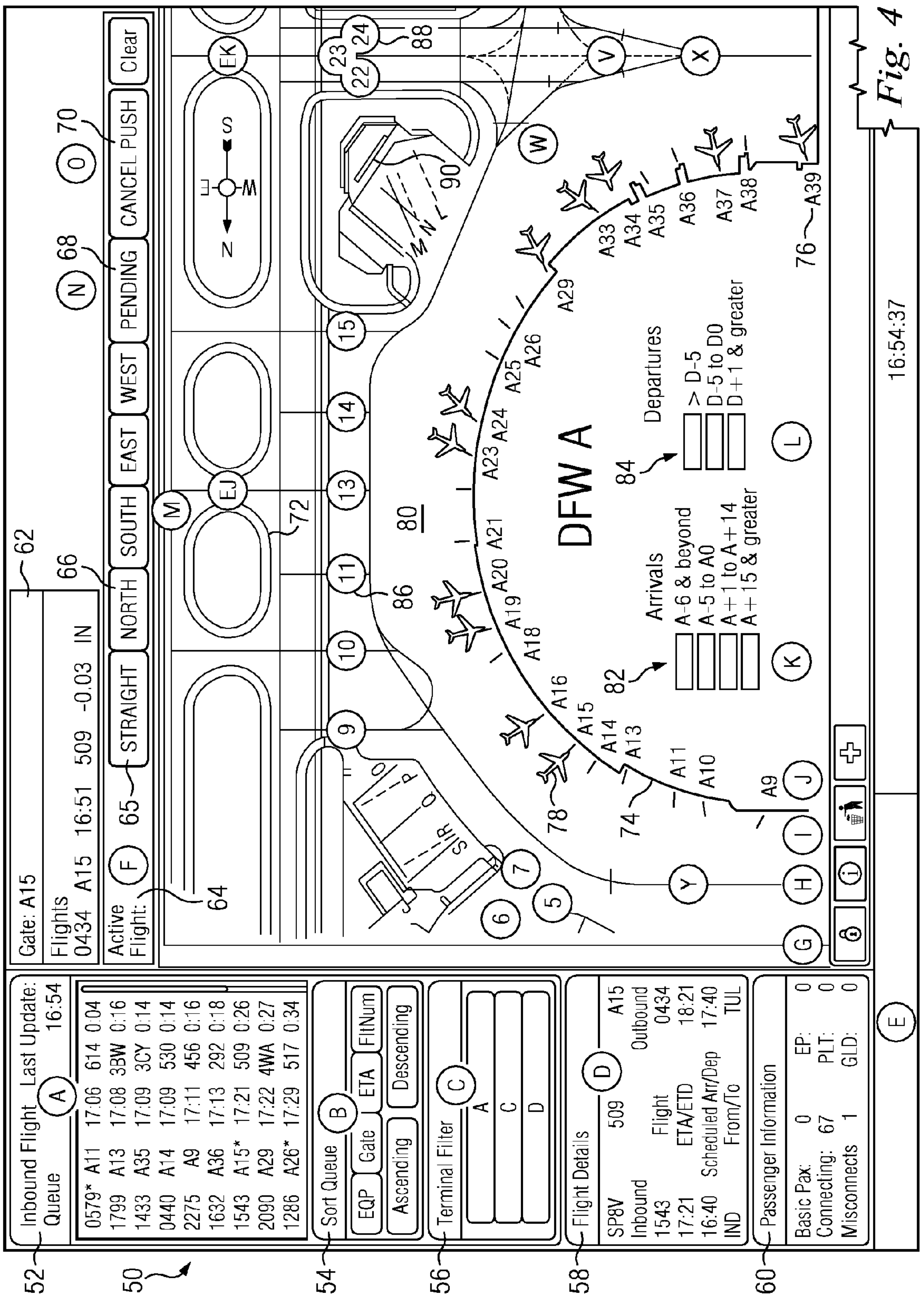
FIG. 4 is a diagrammatic illustration of an interface displayed during the execution of the method of FIG. 3, according to an exemplary embodiment.

In an exemplary embodiment, as illustrated in FIG. 4 with continuing reference to FIGS. 1-3, to execute the method 36, an interface 50 is displayed on the touch-enabled display 24*c* of the user device 24. The interface 50 includes an inbound flight queue box 52, a sort queue box 54, a terminal filter box 56, a flight details box 58, a passenger information box 60, a gate detail box 62, an active flight box 64, a push straight back button 65, a plurality of tail direction buttons 66, a pending push button 68, and a cancel button 70. The interface 50 further includes a taxiway graphic 72, which represents the airport taxiway 14, and a terminal graphic 74, which represent the airline terminal 16. A plurality of gate identifiers 76, each of which represents one of the airline gates 18, are distributed along the terminal graphic 74. The interface 50 further includes a plurality of airplane icons 78, each of which represents one of the airplanes 20 and is displayed proximate one of the gate identifiers 76. A respective aircraft details indicator 79 is positioned proximate each of the airplane icons 78. An area 80 of the interface 50 represents the predetermined area 12. The interface 50 further includes an arrival legend graphic 82, a departure legend graphic 84, a plurality of entry/exit spots 86 located in the area 80 but proximate the taxiway graphic 72, and a plurality of entry/exit spots 88 located proximate a facility graphic 90, which represents a facility area of the airport. In several exemplary embodiments, the interface 50 further includes one or more additional spots at locations on the interface 50 that represent additional locations in the predetermined area 12.

Figure 5:
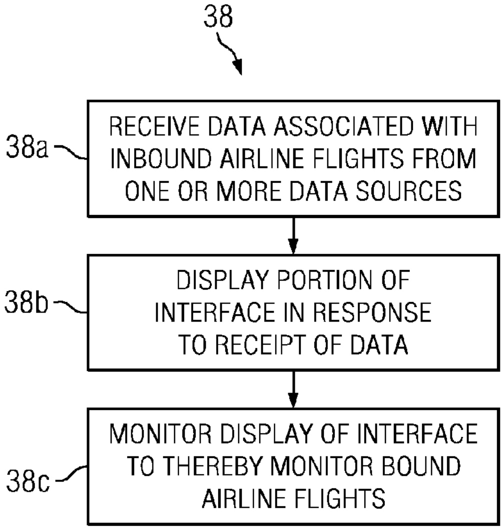
FIG. 5 is a flow chart illustration of a step of the method of FIG. 3, according to an exemplary embodiment.

In an exemplary embodiment, as illustrated in FIG. 5 with continuing reference to FIGS. 1-4, to monitor the plurality of inbound airline flights in the step 38 of the method 36, data associated with inbound airline flights is received from one or more data sources in step 38*a*, in response to the step 38*a* at least a portion of the interface 50 is displayed on the touch-enabled display 24*c* in step 38*b*, and the display of the interface 50 in the step 38*b* is monitored by the traffic planner in step 38*c* to thereby monitor the inbound airline flights.

In an exemplary embodiment, to receive data associated with inbound airline flights from one or more data sources in the step 38*a*, the user device 24 receives data associated with inbound airline flights from one or more of the following: an airline operational data source and forecasting engine such as the one disclosed in U.S. patent application Ser. No. 12/683,984, filed Jan. 7, 2010, the entire disclosure of which is incorporated herein by reference; a dispatch environmental control system (DECS) and/or one or more computer systems, host-based systems and/or applications thereof; an enhanced reservation system (RES) and/or one or more computer systems, host-based systems and/or applications thereof; the Federal Aviation Administration (FAA) and/or one or more computer systems, host-based systems and/or applications thereof; off-schedule operations (OSO) and/or one or more computer systems, host-based systems and/or applications thereof; the selected station; one or more other stations; a flight operating system (FOS) and/or one or more computer systems, host-based systems and/or applications thereof; and an aircraft communication addressing and reporting system (ACARS) and/or one or more computer systems, host-based systems and/or applications thereof.

Figure 6:
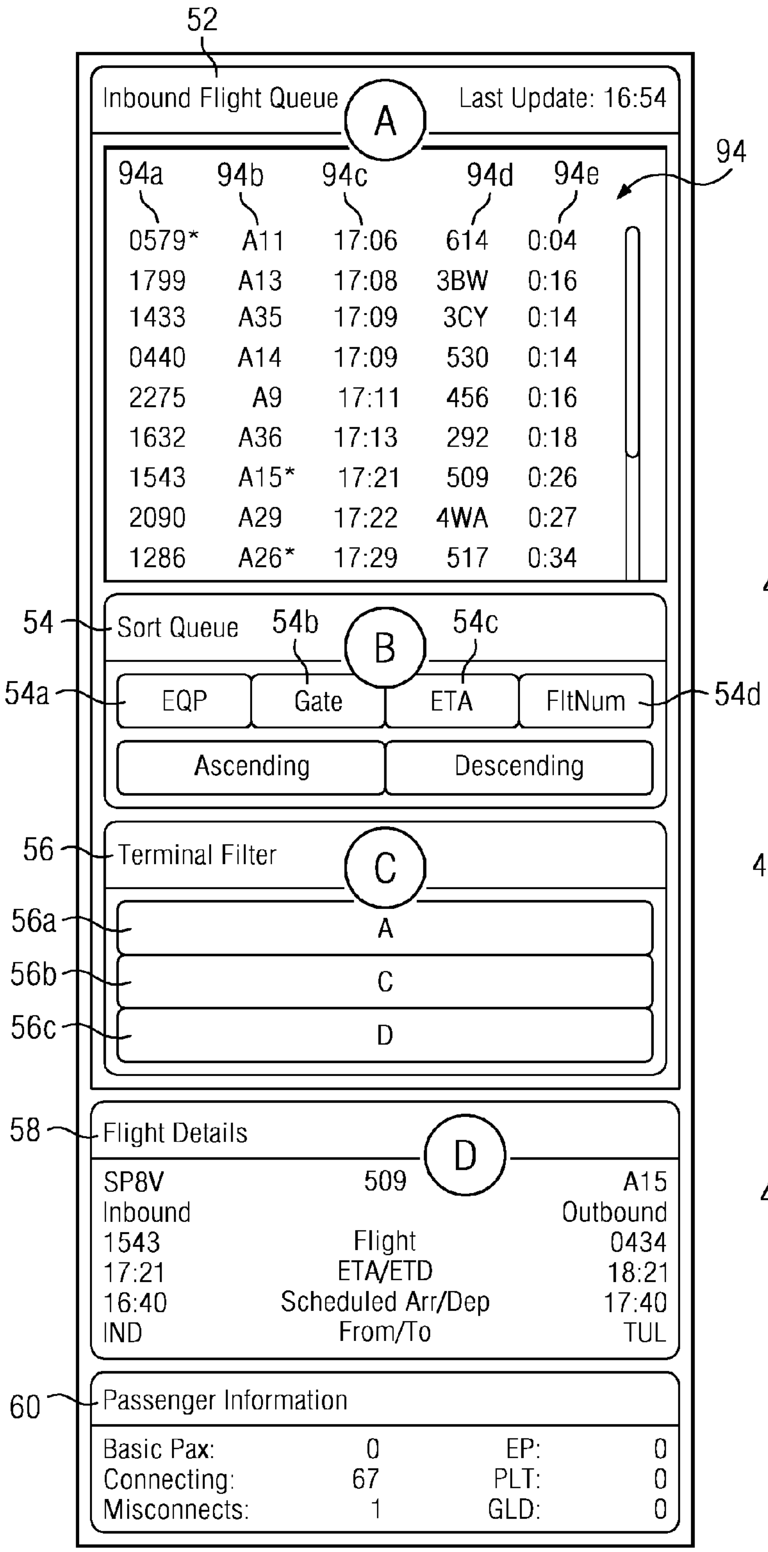
FIG. 6 is a diagrammatic illustration of a portion of the interface of FIG. 4 displayed during at least a portion of the step of FIG. 5, according to an exemplary embodiment.

In an exemplary embodiment, as illustrated in FIG. 6 with continuing reference to FIGS. 1-5, to display at least a portion of the interface 50 on the touch-enabled display 24*c* in the step 38*b*, the inbound flight queue box 52 is displayed as part of the interface 50. The box 52 includes a plurality of rows 94, with each row corresponding to an inbound airline flight and including a flight number indicator 94*a*, a scheduled arrival gate indicator 94*b*, an estimated time of arrival indicator 94*c*, a tail number indicator 94*d* which indicates the tail number of the airplane 20 used by the inbound airline flight, and a countdown indicator 94*e*. The countdown indicator 94*e* indicates the amount of time remaining until the estimated time of arrival (indicated by the indicator 94*c*) will be reached.

The sort queue box 54 is also displayed as part of the interface 50 in the step 38*b*. The sort queue box 54 includes buttons 54*a*, 54*b*, 54*c* and 54*d*, by which the plurality of rows 94 (corresponding to the plurality of inbound airline flights) in the inbound flight queue box 52 are sorted by equipment (i.e., what type of aircraft the respective airplane 20 is), scheduled arrival gate, estimated time of arrival, and flight number, respectively. For example, as shown in FIG. 6, the plurality of rows 94 are sorted by estimated time of arrival. The traffic planner can sort the inbound flight queue box 52 according to his or her preferences, needs, etc., thereby improving the ability of the traffic planner to quickly obtain the information deemed by him or her to be most important to his or her traffic planning duties at any point in time.

The terminal filter box 56 is also displayed as part of the interface 50 in the step 38*b*. The terminal filter box 56 includes buttons 56*a*, 56*b* and 56*c*, by which respective airline terminals are selected so that only the rows 94 corresponding to inbound airline flights having scheduled arrival gates at the selected terminals are displayed in the flight queue box 52, and so that corresponding graphics may be displayed as part of the interface 50 in the step 38*b*. For example, as shown in FIG. 6, the button 56*a* is selected, which corresponds to a terminal named "Terminal A" at the airport, which in turn corresponds to the airline terminal 16 in this example. As a result, the plurality of rows 94 displayed in the flight queue box 52 correspond to inbound airline flights that have scheduled arrival gates at Terminal A (or the terminal 16), and the terminal graphic 74 is displayed. In several exemplary embodiments, two are more of the buttons 56*a*, 56*b* and 56*c* are selected and, a result, the plurality of rows 94 displayed in the flight queue box 52 correspond to inbound airline flights that have scheduled arrival gates at Terminal A (or the terminal 16) and an additional terminal, and the terminal graphic 74 and another terminal graphic are displayed. The traffic planner uses the terminal filter box 56 to remove inbound airline flights from the interface 50 for which he or she is not responsible for, which do not need to be monitored, and/or for any other reasons, thereby de-cluttering the interface 50 so that the traffic planner can focus on the information that is most important to his or her traffic planning duties.

The flight details box 58 is also displayed as part of the interface 50 in the step 38*b*. The flight details box 58 displays details regarding a selected inbound airline flight. Specifically, the details displayed in the flight details box 58 include the tail number of the airplane 20 used by the selected inbound airline flight, the scheduled arrival gate, the flight number, the estimated time of arrival, the scheduled time of arrival, and the departure location. Additionally, the details displayed in the flight details box 58 further include the flight number of the outbound airline flight that is expected to use the airplane 20 used by the selected inbound airline flight, the estimated time of departure of the outbound airline flight, the scheduled time of departure, and the destination location. In an exemplary embodiment, the selected inbound airline flight, the details of which are displayed in the flight details box 58, may be selected by touching the desired row 94 in the inbound flight queue box 52 on the touch-enabled display 24*c*. As a result, details of the selected inbound airline flight are displayed in the flight details box 58 in accordance with the foregoing, and are further displayed in the active flight box 64 (shown in FIG. 4), which displays the details corresponding to the indicators 94*a*, 94*b*, 94*c*, 94*d* and 94*e* in the row 94 that corresponds to the selected inbound airline flight.

The passenger information box 60 is also displayed as part of the interface 50 in the step 38*b*. The passenger information box 60 displays details regarding the passengers on the selected inbound airline flight, including the number of passengers, the number of connecting passengers, the number of terminating passengers, the number of passengers that will misconnect, and the number of passengers belonging to different frequent-flyer clubs and/or statuses (e.g., "elite" passengers).

In the step 38*c*, the traffic planner monitors the display of the inbound flight queue box 52, the flight details box 58, the passenger information box 60 and the active flight box 64, thereby monitoring all of the inbound airline flights of interest to the traffic planner. As a result, the traffic planner is provided with all of the elements needed to make more valued and informed decisions with respect to the inbound airline flights and the traffic planning thereof in the predetermined area 12.

Figure 7:
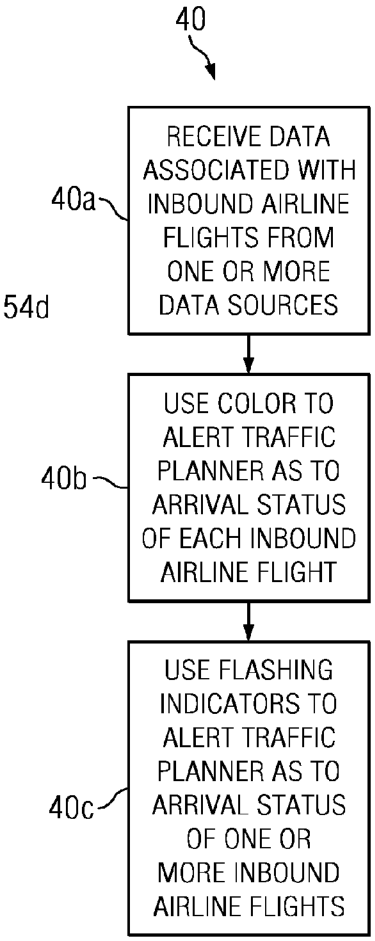
FIG. 7 is a diagrammatic illustration of another step of the method of FIG. 3, according to an exemplary embodiment.

In an exemplary embodiment, as illustrated in FIG. 7 with continuing reference to FIGS. 1-6, to provide functional alerts for each of the inbound airline flights in the step 40, data associated with the arrival status of each inbound airline flight is received from one or more sources in step 40*a*, color is used to alert the traffic planner as to the arrival status of the inbound flight in step 40*b*, and in step 40*c* flashing indicators are further used to alert the traffic planner as to the arrival status of the inbound flight.

In an exemplary embodiment, the step 40*a* is the same as, is combined with, and/or occurs before, during and/or after, the step 38*a* of the step 38. In an exemplary embodiment, the data received in the step 40*a* includes the estimated and scheduled arrival times of the inbound airline flights, and data associated with whether the corresponding airplane 20 has touched ground at the airport and thus has an "on" status. In an exemplary embodiment, the one or more sources from which data is received in the step 40*a* are the same as the one or more sources from which data is received in the step 38*a*, as described above.

Figure 8:
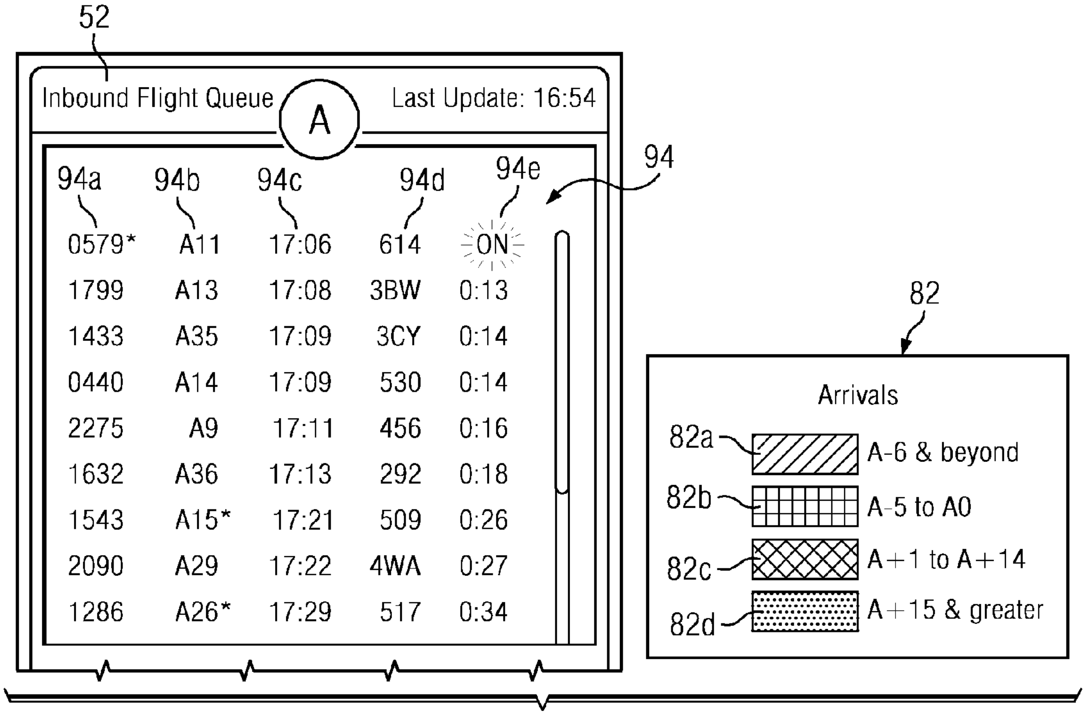
FIG. 8 is a diagrammatic illustration of portions of the interface of FIG. 4 that are displayed during at least a portion of the step of FIG. 7, according to an exemplary embodiment.

In an exemplary embodiment, as illustrated in FIG. 8 with continuing reference to FIGS. 1-7, to use color to alert the traffic planner in the step 40*b*, the rows 94 are either displayed in a particular font color, and/or are highlighted using the particular color, in accordance with the legend 82. As shown in FIG. 8, the legend 82 includes fields 82*a*, 82*b*, 82*c* and 82*d*.

The field 82*a* of the legend 82 indicates a first color for each inbound airline flight that falls within a predetermined time threshold, namely an estimated time of arrival that is at least 6 minutes before the scheduled time of arrival, designated as "A−6 & beyond" in the legend 82. Thus, if the estimated time of arrival for an inbound airline flight corresponding to one of the rows 94 is at least 6 minutes before the scheduled time of arrival, the row 94 is displayed in a font color and/or highlighted using the first color indicated by the field 82*a*.

The field 82*b* of the legend 82 indicates a second color for each inbound airline flight that falls within another predetermined time threshold. Specifically, the field 82*b* indicates a second color for each inbound airline flight that has an estimated time of arrival that ranges from 5 minutes before the scheduled time of arrival to A+0, i.e., the scheduled time of arrival, designated as "A−5 to A0" in the legend 82. Thus, if the estimated time of arrival for an inbound airline flight corresponding to one of the rows 94 ranges from 5 minutes before the scheduled time of arrival to the scheduled time of arrival, the row 94 is displayed in a font color and/or highlighted using the second color indicated by the field 82*b*.

The field 82*c* of the legend 82 indicates a third color for each inbound airline flight that falls within yet another predetermined time threshold. Specifically, the field 82*c* indicates a third color for each inbound airline flight that has an estimated time of arrival that ranges from 1 minute after its scheduled time of arrival to 14 minutes after its scheduled time of arrival, designated as "A+1 to A+14" in the legend 82. Thus, if the estimated time of arrival for an inbound airline flight corresponding to one of the rows 94 ranges from 1 minute after the scheduled time of arrival to 14 minutes after the scheduled time of arrival, the row 94 is displayed in a font color and/or highlighted using the third color indicated by the field 82*c*. In several exemplary embodiments, the field 82*c* indicates a color corresponding to a "grace period," which is set by a governmental entity and, in several exemplary embodiments, may be 14 minutes.

The field 82*d* of the legend 82 indicates a fourth color for each inbound airline flight that falls within still yet another predetermined time threshold. Specifically, the field 82*d* indicates a fourth color for each inbound airline flight that has an estimated time of arrival that is at least 15 minute after the scheduled time of arrival, designated as "A+15 & greater" in the legend 82. Thus, if the estimated time of arrival for an inbound airline flight corresponding to one of the rows 94 is at least 15 minutes after the scheduled time of arrival, the row 94 is displayed in a font color and/or highlighted using the fourth color indicated by the field 82*d*.

The font color and/or the highlight color for each of the rows 94 automatically changes as a function of time. That is, as time passes, the font color and/or the highlight color for each of the rows 94 is automatically changed in accordance with the colors set forth in the legend 82, alerting the traffic planner regarding the changes in the statuses of the inbound airline flights without requiring that the traffic planner conduct any mathematical calculations. Although the traffic planner does not have control over the arrival times of the inbound airline flights, the traffic planner can make advance plans for any of the airplanes 20 that are arriving late, with the step 40*b* providing a colorful reminder/alert that attention is required for a specific inbound airline flight.

In an exemplary embodiment, to use flashing indicators to alert the traffic planner as to the arrival status of one or more inbound flights in step 40*c*, the rows 94 corresponding to the inbound airline flights noted by the color indicated in, for example, the field 82*d*, begin to flash, further alerting the traffic planner as to the severity of the tardiness of the inbound flights. In an exemplary embodiment, to use flashing indicators to alert the traffic planner as to the arrival status of one or more inbound flights in step 40*c*, the countdown indicator 94*e* displays a flashing "ON" instead of a time value when the airplane 20 used by the corresponding inbound airline flight has touched ground and thus has an "on" status, as shown in the row 94 corresponding to the inbound airline flight having 0579 as its the flight number, as indicated by the flight number indicator 94*a*. In several exemplary embodiment, in the steps 40*b* and/or 40*c*, instead of, or in addition to changing colors and/or using flashing indicators in accordance with the foregoing, one or more additional flash indicators are used to alert the traffic planner; for example, the rows 94 and/or indicators may flash or pulse at speeds that change as time passes.

Figure 9:
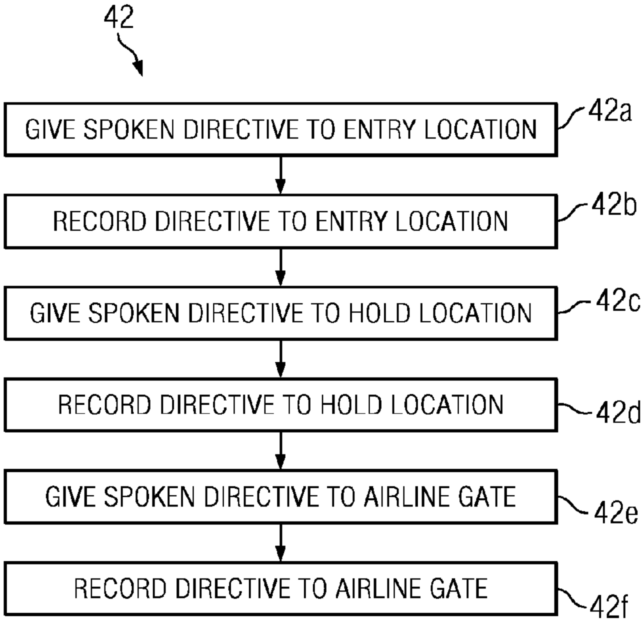
FIG. 9 is a diagrammatic illustration of yet another step of the method of FIG. 3, according to an exemplary embodiment.

In an exemplary embodiment, as illustrated in FIG. 9 with continuing reference to FIGS. 1-8, to record directives for each inbound airline flight in the step 42, in step 42*a* a spoken directive to an entry location in the predetermined area 12 is given by the traffic planner to the crew of the airplane 20 used by the inbound airline flight that has an "on" status and needs direction. The entry location in the predetermined area 12 is the location in the area 12 at which the airplane 20 moves into the area 12. The spoken directive to the entry location is recorded in step 42*b*. A spoken directive to a hold location is given by the traffic planner in step 42*c*, and the spoken directive to the hold location is recorded in step 42*d*. A spoken directive to one of the airline gates 18 is given by the traffic planner in step 42*e*, and the spoken directive to the airline gate 18 is recorded in step 42*f*.

Figure 10:
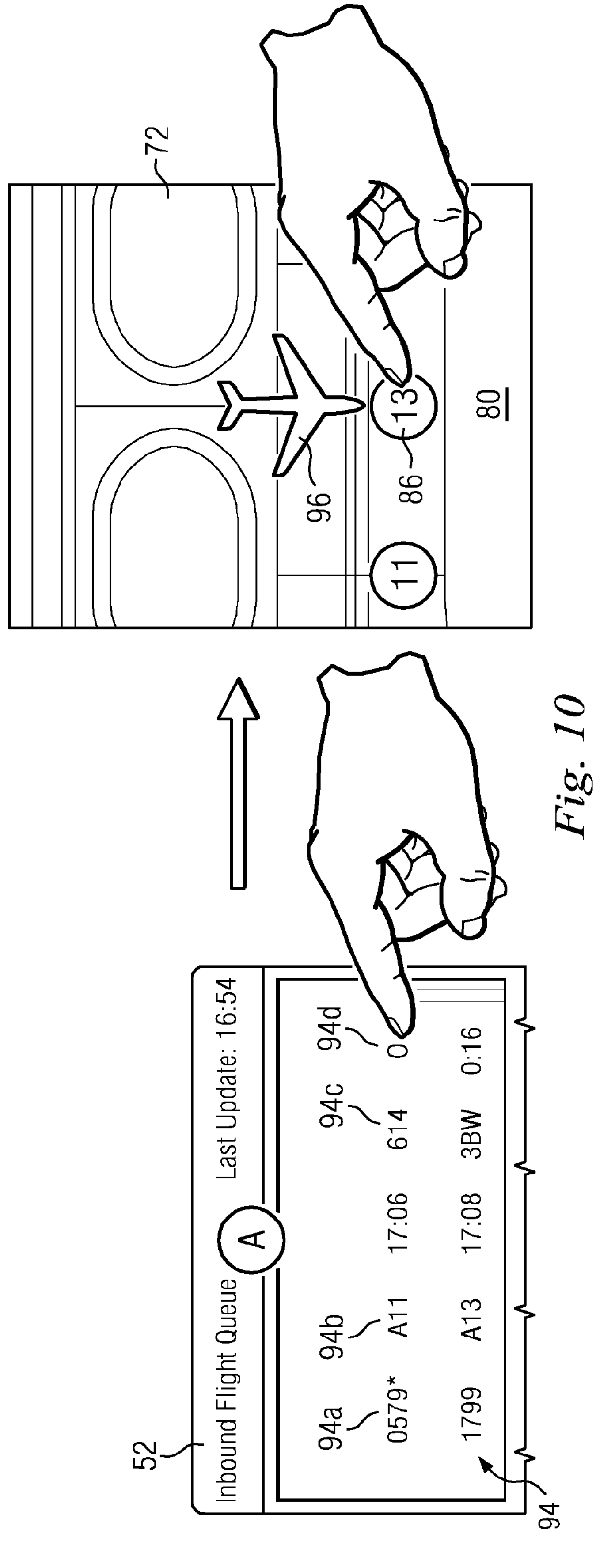
FIG. 10 is a diagrammatic illustration of multi-touch interaction with portions of the interface of FIG. 4 during at least a portion of the step of FIG. 9, according to an exemplary embodiment.

In an exemplary embodiment, as illustrated in FIG. 10 with continuing reference to FIGS. 1-9, to record the directive to the entry location in the area 12 in the step 42*b*, the traffic planner touches the row 94 on the touch-enabled display 24*c* corresponding to the inbound airline flight for which he or she gave the spoken directive in the step 42*a*, and then touches one of the entry/exit spots 86 and 88 on the touch-enabled display 24*c* that corresponds to the entry location provided in the spoken directive. This action results in the automatic removal of the touched row 94 from the inbound flight queue box 52, and the automatic display of an airplane icon 96 at the touched entry/exit spot 86 or 88, thereby recording the spoken directive to the entry location given in the step 42*a*. As shown in FIG. 10, the airplane icon 96 is automatically displayed at one of the entry/exit spots 86. The airplane icon 96 is identical to each of the airplane icons 78, but for the purpose of clarity the airplane icon initially displayed at the entry/exit spot 86 in FIG. 10 will be specifically referred to as the airplane icon 96.

In an exemplary embodiment, in the steps 42*a* and 42*b*, the entry location in the area 12 may be a location via which the airplane 12 is to travel to a hanger or maintenance facility, rather than to one of the airline gates 18.

For the purpose of this detailed description, touching a portion of the interface 50 on the touch-enabled display 24*c* includes single tapping, double tapping, triple tapping, touching and holding, other types of actual touching, different types of non-actual touching such as, for example, hovering a finger or stylus over the portion of the interface 50, other hand/finger gestures, and/or any combination thereof.

In an exemplary embodiment, touching the airplane icon 96 on the touch-enabled display 24*c* results in the selection of the inbound airline flight represented by the airplane icon 96 and thus the automatic display of flight details in the flight details box 58, flight details in the active flight box 64, and passenger information in the passenger information box 60.

In an exemplary embodiment, to give a spoken directive to a hold location in the step 42*c*, the traffic planner instructs the crew of the airplane 20 represented by the icon 96 to move the airplane 20 within the predetermined area 12 to a hold location in the area 12, which is located between the entry location and the terminal 16.

Figure 11:
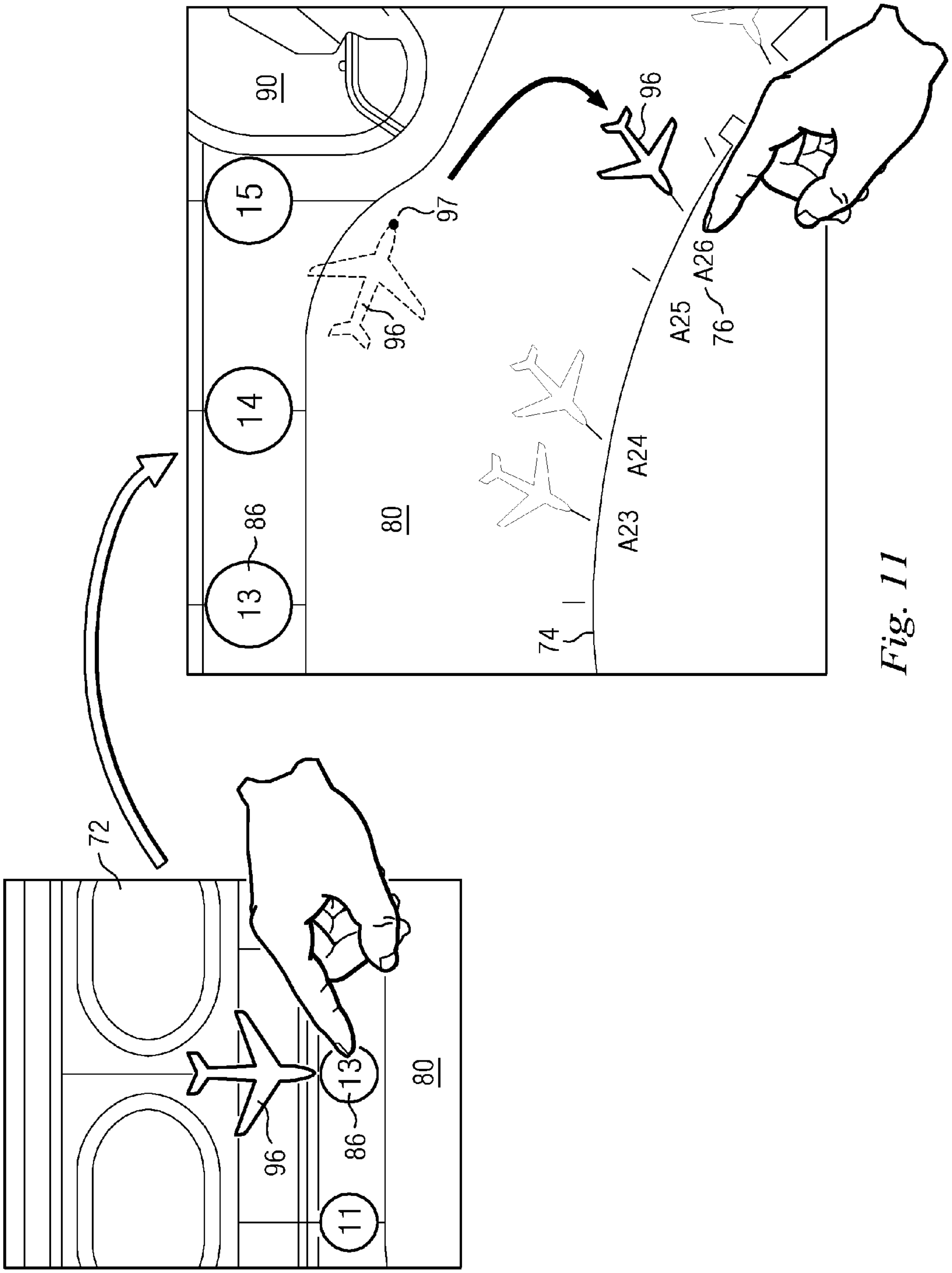
FIG. 11 is another diagrammatic illustration of multi-touch interaction with portions of the interface of FIG. 4 during at least a portion of the step of FIG. 9, according to an exemplary embodiment.

In an exemplary embodiment, as illustrated in FIG. 11 with continuing reference to FIGS. 1-10, to record the directive to the hold location in the step 42*d*, the traffic planner touches the spot 86 or 88 (86 in FIG. 11) on the touch-enabled display 24*c* at which the icon 96 is located. The traffic planner then touches the area 80 on the touch-enabled display 24*c* at a hold spot 97 that corresponds to the hold location in the predetermined area 12. As a result, the icon 96 is automatically removed from the spot 86 (or 88 in other examples) and automatically displayed at the touched spot 97 in the area 80, thereby recording the spoken directive to the hold location given in the step 42*c*.

In an exemplary embodiment, with continuing reference to FIG. 11 and also to FIGS. 1-10, the steps 42*c* and 42*d* are omitted and the airplane 20, while still at the entry location, is given a spoken directive directly to the airline gate 18 in the step 42*e*. That is, the airplane 20 is directed to move within the area 12 from the entry location to the airline gate 18. To record the directive to the airline gate 18 in the step 42*f* when the steps 42*c* and 42*d* are omitted, the traffic planner touches the spot 86 or 88 (86 in FIG. 11) on the touch-enabled display 24*c* at which the icon 96 is located. If the icon 96 is the only airplane icon at the entry/exit spot 86 (or 88 in other examples), a "send to gate" button (not shown) appears in the active flight box 64. The traffic planner can either touch the "send to gate" button on the touch-enabled display 24*c*, or touch the gate identifier 76 on the touch-enabled display 24*c* that represents the airline gate 18 to which the airplane 20 was directed. In response to touching either the "send to gate" button or the gate identifier 76, the airplane icon 96 is automatically removed from the spot 86 (or 88 in other examples) and automatically displayed proximate the touched gate identifier 76, thereby recording the spoken directive to the airline gate 18 given in the step 42*e*. The airplane icon 96 blinks until the airplane 20 is registered with an "in" status, that is, has actually stopped at the airline gate 18. Alternatively, if there is more than one of the icons 96 at the spot 86 (or 88 in other examples), a pop-up box (not shown) will be displayed in response to the touching of the spot 86, with the pop-up box identifying the respective inbound airline flights that correspond to the icons 96. The traffic planner selects one of the inbound airline flights by touching the touch-enabled display 24*c*, and then in the step 42*f* records the spoken directive given in the step 42*e* in accordance with the foregoing.

In an exemplary embodiment, with continuing reference to FIG. 11 and also to FIGS. 1-10, to record the directive to the airline gate 18 in the step 42*f* when the steps 42*c* and 42*d* are not omitted, the traffic planner touches the spot 97 on the touch-enabled display 24*c* at which the icon 96 is located. If the icon 96 is the only airplane icon at the spot 97, a "send to gate" button (not shown) appears in the active flight box 64. The traffic planner can either touch the "send to gate" button on the touch-enabled display 24*c*, or touch the gate identifier 76 on the touch-enabled display 24*c* that represents the airline gate 18 to which the airplane 20 was directed. In response to touching either the "send to gate" button or the gate identifier 76, the airplane icon 96 is automatically removed from the spot 97 and automatically displayed proximate the gate identifier 76, thereby recording the spoken directive to the airline gate 18 given in the step 42*e*, by which the airplane 20 is directed to move within the area 12 from the hold location to the airline gate 18. The airplane icon 96 blinks until the airplane 20 is registered with an "in" status, that is, has actually stopped at the airline gate 18. Alternatively, if there is more than one of the icons 96 at the spot 97, a pop-up box (not shown) is displayed in response to the touching of the spot 97, with the pop-up box identifying the respective inbound airline flights that correspond to the icons 96. The traffic planner selects one of the inbound airline flights by touching the touch-enabled display 24*c*, and then in the step 42 records the spoken directive given in the step 42*e* in accordance with the foregoing.

Figure 12:
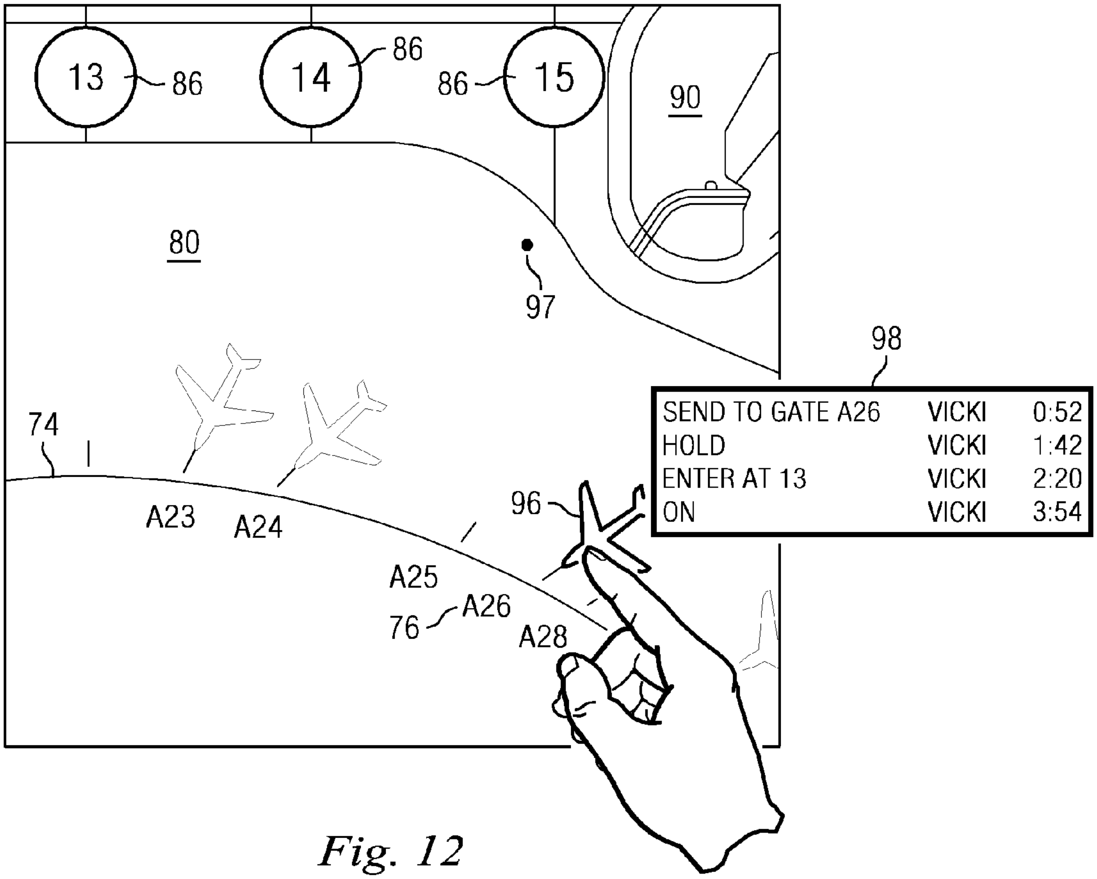
FIG. 12 is a diagrammatic illustration of touch interaction with a portion of the interface of FIG. 4 after the step of FIG. 9, according to an exemplary embodiment.

In an exemplary embodiment, as illustrated in FIG. 12 with continuing reference to FIGS. 1-11, before, during or after the steps 42*a*, 42*b*, 42*c*, 42*d*, 42*e* and 42*f*, all recorded directives associated with the inbound airline flights continue to be stored in the user device 24 and/or the module 30, regardless of whether the recorded directive is no longer displayed on the touch-enabled display 24*c*. The recorded directives associated with any inbound airline flight are accessible to the traffic planner. More particularly, as shown in FIG. 12, touching the airplane icon 96 on the touch-enabled display 24*c* results in the selection of the inbound airline flight represented by the airplane icon 96, and also results in an automatic display of a listing of all the recorded directives associated with the flight in a pop-up box 98 positioned proximate the airplane icon 96. Thus, a cumulative record of all recorded directives for the inbound airline flight represented by the airplane icon 96 can be provided to the traffic planner at any point in time before, during or after the steps 42 and 44.

In several exemplary embodiments, before, during and/or after the steps 42*a*, 42*b*, 42*c*, 42*d*, 42*e* and 42*f*, the step 40 is executed. The color of the icon 96 automatically changes as a function of time. More particularly, as time passes, the color of the airplane icon 96 changes in accordance with the colors set forth in the legend 82, in the same manner as the rows 94 change color, until the airplane 20 is registered with an "in" status, that is, has stopped at the airline gate 18 to which it has been directed and thus stops blinking. As a result, the traffic planner is reminded regarding which inbound airline flights are arriving later than others, and is alerted to those icon(s) 96 that represent airplane(s) 20 that need attention and/or planning. After the icon 96 has stopped blinking, the icon 96 changes colors in accordance with the colors set forth in the legend 84.

Figure 13:
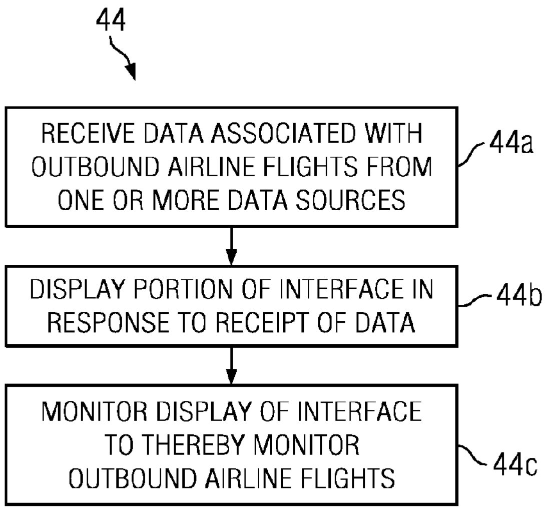
FIG. 13 is a flow chart illustration of still yet another step of the method of FIG. 3, according to an exemplary embodiment.

In an exemplary embodiment, as illustrated in FIG. 13 with continuing reference to FIGS. 1-12, to monitor the plurality of outbound airline flights in the step 44 of the method 36, data associated with the outbound airline flights is received from one or more data sources in step 44*a*, in response to step 44*a* at least a portion of the interface 50 is displayed on the touch-enabled display 24*c* in step 44*b*, and the display of the interface 50 in the step 44*b* is monitored by the traffic planner in step 44*c* to thereby monitor the outbound airline flights.

In an exemplary embodiment, the step 44*a* is the same as, is combined with, and/or occurs before, during and/or after, the step 38*a* of the step 38 and/or the step 40*a* of the step 40. In an exemplary embodiment, the data received in the step 44*a* includes the estimated and scheduled departure times of the outbound airline flights. In an exemplary embodiment, the one or more sources from which data is received in the step 44*a* are the same as the one or more sources from which data is received in the steps 38*a* and/or 40*a*, as described above.

In an exemplary embodiment, with continuing reference to FIGS. 1-13, to display at least a portion of the interface 50 on the touch-enabled display 24*c* in the step 44*b*, the airplane icons 78 are automatically displayed as part of the interface 50, as shown in FIG. 4. The airplane icons 78 are displayed proximate respective ones of the airline gate identifiers 76. Each of the airplane icons 78 represents an outbound airline flight, and the corresponding airline gate identifier 76 represents the departure gate of the outbound airline flight. The aircraft details indicators 79 are also displayed as part of the interface 50 in the step 44*b*. Each of the aircraft details indicators 79 is positioned proximate a respective one of the airplane icons 78, and provides details regarding the outbound airline flight that will use the airplane 20 represented by the airplane icon 78. As shown in FIG. 4, the details provided by each of the aircraft details indicators 79 include flight number, tail number, estimated time of departure, and destination location.

The terminal filter box 56 is also displayed as part of the interface 50 in the step 44*b*. As noted above, the terminal filter box 56 includes the buttons 56*a*, 56*b* and 56*c*, by which respective airline terminals are selected so that only the icons 78 and the indicators 79 corresponding to outbound airline flights departing from the selected terminal(s) are displayed as part of the interface 50 in the step 44*b*.

The flight details box 58 is also displayed as part of the interface 50 in the step 44*b*. The flight details box 58 displays details regarding a selected outbound airline flight. Specifically, the details displayed in the flight details box 58 include the tail number of the airplane 20 used by the selected outbound airline flight, the scheduled departure gate, the flight number, the estimated time of departure, the scheduled time of departure, and the destination location. Additionally, the details displayed in the flight details box 58 further include the flight number of the inbound airline flight that used the airplane 20 used by the selected outbound airline flight, the estimated time of arrival of the inbound airline flight, the scheduled time of arrival, and the departure location. In an exemplary embodiment, the selected outbound airline flight, the details of which are displayed in the flight details box 58, may be selected by touching the desired airplane icon 78 on the touch-enabled display 24*c*. As a result, details of the selected outbound airline flight are displayed in the flight details box 58 in accordance with the foregoing, and are further displayed in the active flight box 64 (shown in FIG. 4).

The passenger information box 60 is also displayed as part of the interface 50 in the step 44*b*. The passenger information box 60 displays details regarding the passengers on the selected outbound airline flight, including the number of passengers, the number of connecting passengers, the number of terminating passengers, the number of passengers that will misconnect, and the number of passengers belonging to different frequent-flyer clubs and/or statuses (e.g., "elite" passengers).

In the step 44*c*, the traffic planner monitors the display of the airplane icons 78, the aircraft details indicators 79, the flight details box 58, the passenger information box 60 and the active flight box 64. As a result, the traffic planner is provided with all of the elements needed to make more valued and informed decisions with respect to the outbound airline flights and the traffic planning thereof in the predetermined area 12.

Figure 14:
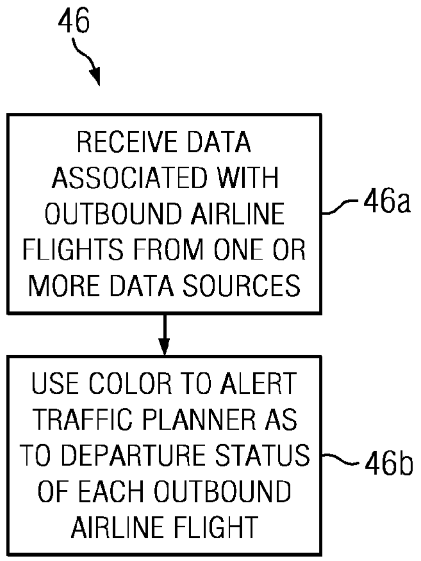
FIG. 14 is a flow chart illustration of still yet another step of the method of FIG. 3, according to an exemplary embodiment.

In an exemplary embodiment, as illustrated in FIG. 14 with continuing reference to FIGS. 1-13, to automatically provide functional alerts for each of the outbound airline flights in the step 46, data associated with the departure status of each outbound airline flight is received from one or more sources in step 46*a*, and color is used to alert the traffic planner as to the departure status of each outbound flight in step 40*b*.

In an exemplary embodiment, the step 46*a* is the same as, is combined with, and/or occurs before, during and/or after, the step 38*a* of the step 38, the step 40*a* of the step 40, and/or the step 44*a* of the step 44. In an exemplary embodiment, the data received in the step 46*a* includes the estimated and scheduled departure times of the outbound airline flights. In an exemplary embodiment, the one or more sources from which data is received in the step 46*a* are the same as the one or more sources from which data is received in the step 38*a*, as described above.

Figure 15:
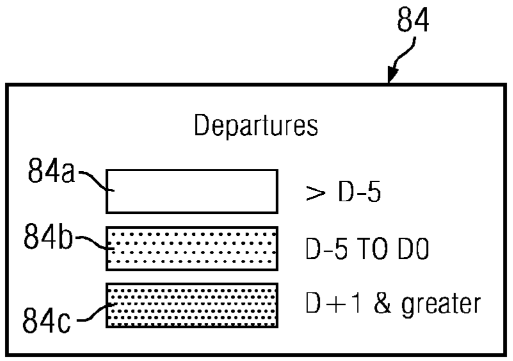
FIG. 15 is a diagrammatic illustration of a portion of the interface of FIG. 4 that is displayed during at least a portion of the step of FIG. 14, according to an exemplary embodiment.

In an exemplary embodiment, as illustrated in FIGS. 4 and 15 with continuing reference to FIGS. 1-3 and 5-14, to use color to alert the traffic planner in the step 46*b*, the airplane icons 78 that represent the airplanes 20 that are not, or are no longer, being used for inbound airline flights but are to be used for outbound airline flights, including the airplane icons 78 that have stopped blinking and thus represent airplanes 20 that have registered with an "in" status as described above, are displayed in a particular color in accordance with the legend 84. As shown in FIG. 15, the legend 84 includes fields 84*a*, 84*b* and 84*c*.

The field 84*a* of the legend 84 indicates a first color for each outbound airline flight that falls within a predetermined time threshold, namely an estimated time of departure that is greater than 5 minutes before the scheduled time of departure, designated as ">D–5" in the legend 84. Thus, if the estimated time of arrival for an outbound airline flight corresponding to one of the icons 78 is greater than 5 minutes before the scheduled time of arrival, the icon 78 is displayed in the first color indicated by the field 84*a*.

The field 84*b* of the legend 84 indicates a second color for each outbound airline flight that falls within another predetermined time threshold. Specifically, the field 84*b* indicates a second color for each outbound airline flight that has an estimated time of departure that ranges from 5 minutes before the scheduled time of departure to D0, i.e., its scheduled time of departure, designated as "D−5 to D0" in the legend 84. Thus, if the estimated time of departure for an outbound airline flight corresponding to one of the icons 78 ranges from 5 minutes before the scheduled time of departure to the scheduled time of departure, the icon 78 is displayed in the second color indicated by the field 84*b*.

The field 84*c* of the legend 84 indicates a third color for each outbound airline flight that falls within yet another predetermined time threshold. Specifically, the field 84*c* indicates a third color for each outbound airline flight that has an estimated time of departure that is at least 1 minute after its scheduled time of departure, designated as "D+1 & greater" in the legend 84. Thus, if the estimated time of departure for an outbound airline flight corresponding to one of the icons 78 is at least 1 minute after the scheduled time of departure, the icon 78 is displayed in the third color indicated by the field 84*c*.

As time passes, the display colors of each of the icons 78 that correspond to outbound airline flights change in accordance with the colors set forth in the legend 84, alerting the traffic planner regarding the changes in the statuses of the outbound airline flights without requiring that the traffic planner conduct any mathematical calculations. Although the traffic planner does not have control over the departure times of the outbound airline flights, the traffic planner can make advance plans for any of the airplanes 20 that are departing late, with the step 46*b* providing a colorful reminder/alert that attention is required for a specific outbound airline flight. In several exemplary embodiments, in the step 46*b*, instead of, or in addition to changing colors, flash indicators are used to alert the traffic planner; that is, the icons 78 flash or pulse at speeds that change as time passes.

Figure 16:
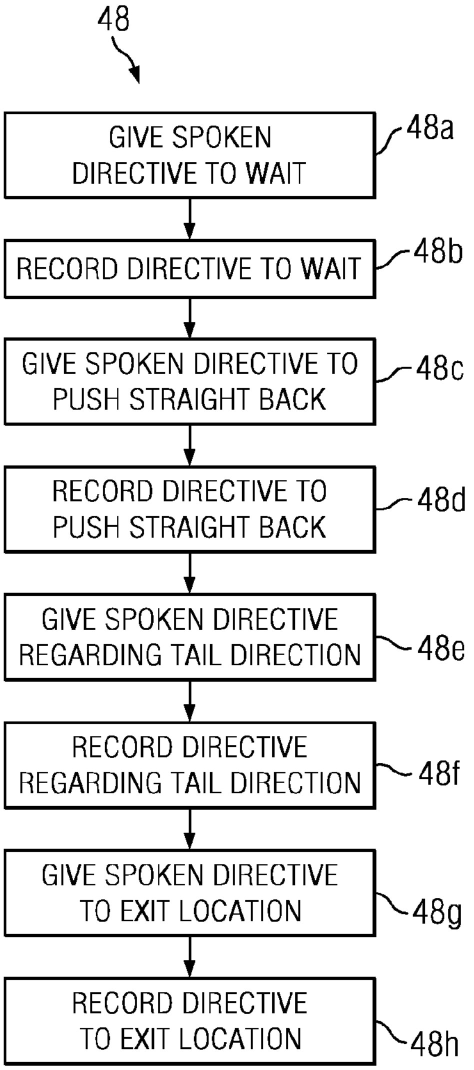
FIG. 16 is a flow chart illustration of still yet another step of the method of FIG. 3, according to an exemplary embodiment.

In an exemplary embodiment, as illustrated in FIG. 16 with continuing reference to FIGS. 1-15, to record directives for each outbound airline flight in the step 48, a spoken directive to wait is given in step 48*a*. The directive to wait is recorded in step 48*b*. A spoken directive to push straight back is given in step 48*c*. The directive to push straight back is recorded in step 48*d*. A spoken directive regarding orientation, or tail direction, is given in step 48*e*. The directive regarding the tail direction is recorded in step 48*f*. A spoken directive to an exit location is given in step 48*g*. The directive to the exit location is recorded in step 48*h*.

The following description of the step 48 refers to the icon 96, which is considered to be example one of the icons 78. The icon 96 is the same as the other icons 78 displayed as part of the interface 50. The step 48 can be executed with any of the icons 78 in the same manner as the step 48 is executed with the icon 96, as described below.

Figure 17:
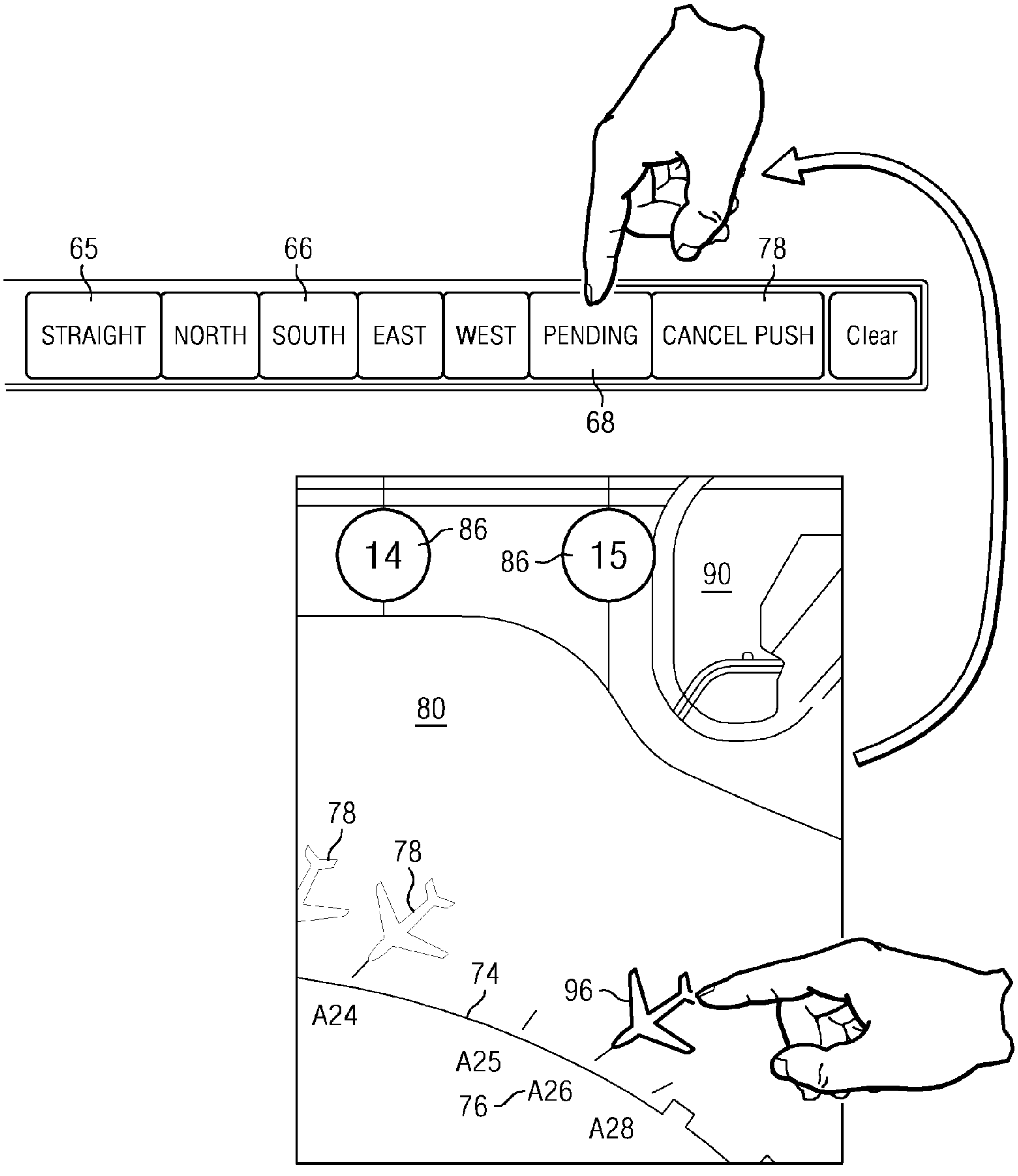
FIG. 17 is a diagrammatic illustration of multi-touch interaction with portions of the interface of FIG. 4 during at least a portion of the step of FIG. 16, according to an exemplary embodiment.

In an exemplary embodiment, as illustrated in FIG. 17 with continuing reference to FIGS. 1-16, to record the directive to wait, the traffic planner touches, for example, the icon 96, and then touches the pending push button 68. As a result, the icon 96 flashes, indicating a pending push, thereby recording the spoken directive to wait at the airline gate 18 until instructions to push are given. The icon 96 will flash until the instruction to push is given.

Figure 18:
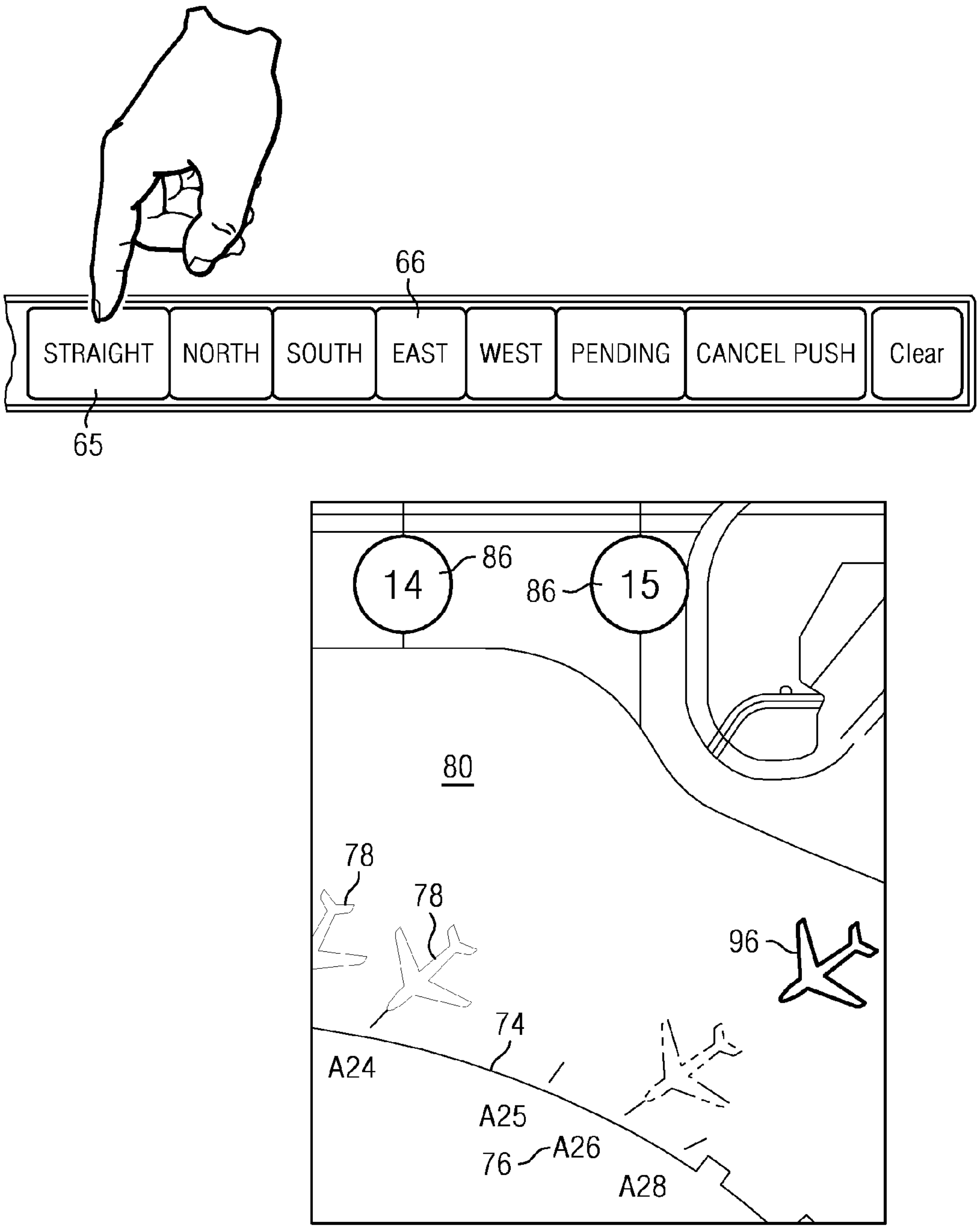
FIG. 18 is another diagrammatic illustration of multi-touch interaction with portions of the interface of FIG. 4 during at least a portion of the step of FIG. 16, according to an exemplary embodiment.

In an exemplary embodiment, as illustrated in FIG. 18 with continuing reference to FIGS. 1-17, to record the directive to push straight back in the step 48*d*, the traffic planner touches the icon 96, and then touches the push straight back button 65. As a result, the icon 96 automatically stops flashing, is removed from the gate 18, and is placed at a location offset from the gate 18 with the tail direction being straight back from the gate 18, thereby recording the spoken directive to move straight back.

In an exemplary embodiment, the steps 48*c* and/or 48*d* are omitted.

Figure 19:
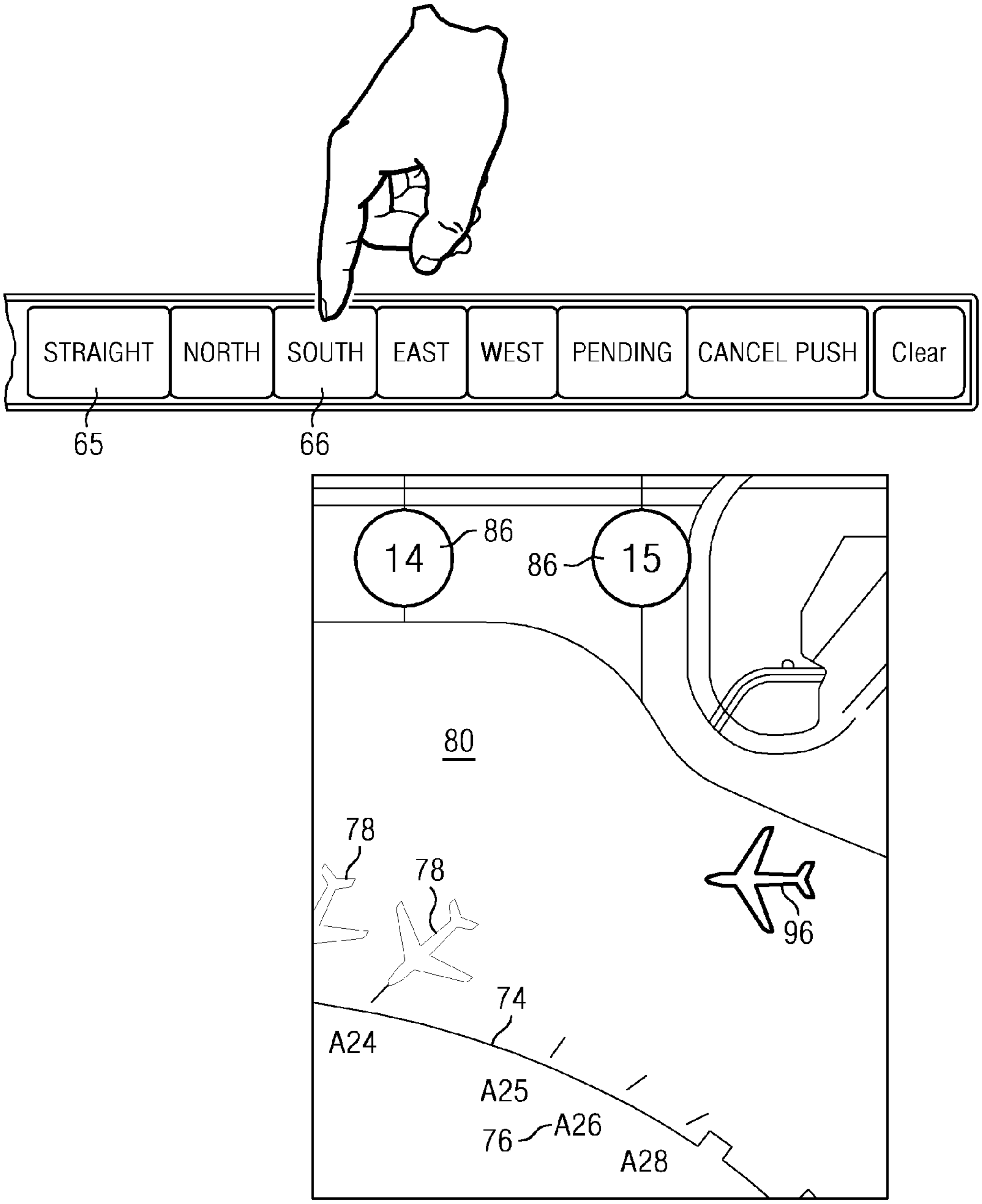
FIG. 19 is yet another diagrammatic illustration of multi-touch interaction with portions of the interface of FIG. 4 during at least a portion of the step of FIG. 16, according to an exemplary embodiment.

In an exemplary embodiment, as illustrated in FIG. 19 with continuing reference to FIGS. 1-18, to record the directive regarding tail direction in the step 48*f*, the traffic planner touches the icon 96, and then touches one of the direction buttons 66. As a result, the tail portion of the icon 96 points in the direction corresponding to the direction indicated by the touched direction button 66. For example, as shown in FIG. 19, the south direction button 66 has been touched and thus the tail portion of the icon 96 points south, with south being to the right as viewed in FIG. 19.

In an exemplary embodiment, the step 48*d* is omitted and, in step 48*f*, the traffic planner touches the icon 96 when the icon 96 is still displayed proximate the corresponding gate identifier 76, and then touches one of the direction buttons 66 to thereby record the directive regarding tail direction. As a result, the icon 96 is automatically placed at a location offset from the gate 18 and the tail portion of the icon 96 points south.

Figure 20:
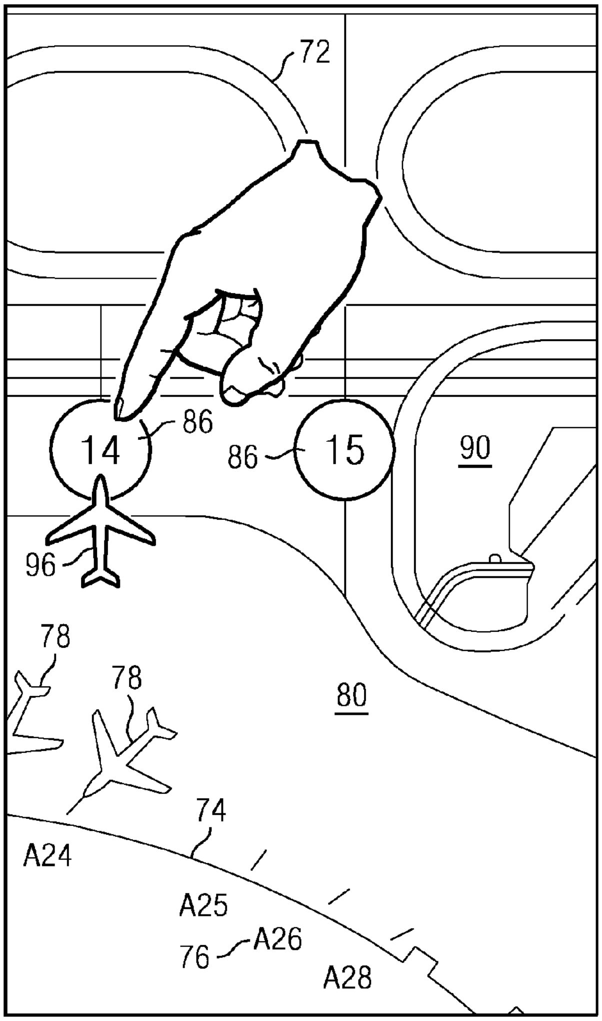
FIG. 20 is still yet another diagrammatic illustration of multi-touch interaction with portions of the interface of FIG. 4 during at least a portion of the step of FIG. 16, according to an exemplary embodiment.

In an exemplary embodiment, as illustrated in FIG. 20 with continuing reference to FIGS. 1-19, to record the directive to the exit location in the area 12 in the step 48*h*, the traffic planner touches the icon 96 on the touch-enabled display 24*c*, and then touches one of the entry/exit spots 86 and 88 on the touch-enabled display 24*c* that corresponds to the exit location provided in the spoken directive in the step 48*g*. This action results in the automatic removal of the icon 96 from its "pushed back" location in the area 80 and the automatic display of the icon 96 at the touched entry/exit spot 86 or 88, thereby recording the spoken directive to the exit location given in the step 48*g*. As shown in FIG. 20, the airplane icon 96 is displayed at one of the entry/exit spots 86.

In an exemplary embodiment, in the steps 48*g* and 48*h*, the exit location in the area 12 may be a location via which the airplane 12 is to travel to a hanger or maintenance facility.

In an exemplary embodiment, to monitor the recorded directives for the inbound and outbound airline flights in the step 50, the recorded directives are monitored by the traffic planner before, during and/or after each of the steps 38, 40, 42, 44, 46 and 48. As a result, the intuitive presentation of the interface 50 during the step 50 and the method 36 as a whole assists the traffic planner in predicting future activities in order to plan accordingly. Flights that are in jeopardy of making their scheduled arrival time or scheduled departure time are the subjects of functional alerts in, for example, the steps 40 and 46, assisting the traffic planner in creating a "faster path" to or away from the respective airline gates 18 before the respective airplanes 20 land or pushes from the gate. In several exemplary embodiments, any one of the airplanes 20 that contains a passenger with a medical emergency can be uniquely identified using the interface 50 and thus the airplane 20 can be routed accordingly by the traffic planner. In several exemplary embodiments, touching the icon 96 or any of the icons 78 reveals a graphic indicating the percentage of passengers boarded on the corresponding airplane 20 parked at the corresponding airline gate 18, which helps the traffic planner determine the best course of action for the arriving airplanes schedule to park at that same airline gate 18.

By executing the method 36, a situational awareness of the status of the predetermined area with respect to all of the airplanes 20 used by the inbound and outbound airline flights is provided to the user or operator of the user device 24, such as the traffic planner. By monitoring the plurality of inbound airline flights in the step 38, the traffic planner is situationally aware of those airplanes that are expected to move into the area 12. By recording directives in the step 42 and monitoring the recorded directives for each inbound airline flight in the step 50, the traffic planner is situationally aware of the airplanes 20 that have entered the area 12. By being provided with functional alerts for the inbound airline flights in the step 40, the traffic planner is situationally aware of the statuses of the inbound airline flights that are expected to move into the area 12 and that have moved into the area 12. By monitoring the plurality of outbound airline flights in the step 44, the traffic planner is situationally aware of those airplanes that are expected to move out of the area 12. By recording directives in the step 48 and monitoring the recorded directives for each outbound airline flight in the step 50, the traffic planner is situationally aware of the airplanes that have moved within the area 12. By being provided with functional alerts for the outbound airline flights in the step 46, the traffic planner is situationally aware of the statuses of the outbound airline flights that are within the area 12 and are expected to move out of the area 12.

In an exemplary embodiment, after the traffic planner has determined that the airplane 20 represented by the icon 96 has passed through the exit location represented by the touched entry/exit spot 86 or 88 and the airplane 20 is on the taxiway 14, the traffic planner removes the icon 96 by touching the icon 96 and then touching another portion of the interface 50 such as, for example, another icon, indicator or other object. As a result, the icon 96 is automatically removed from the interface 50 but information regarding the outbound airline flight is placed in a removed flights queue that can be accessed by the traffic planner by touching a portion of the interface 50 such as, for example, another icon, indicator or other object. In an exemplary embodiment, the information regarding the outbound airline flight is removed from the removed flights queue when the airplane 20 used by the outbound airline flight is registered with an "off" status, that is, the airplane 20 is off the ground and airborne.

In an exemplary embodiment, during the execution of the method 36, the data received in the steps 38*a*, 40*a*, 44*a* and 46*a* is continually and automatically updated, continually and automatically updated at predetermined time intervals such as, for example, every 45 seconds, and/or any combination thereof, thereby ensuring that the data in the steps 38*a*, 40*a*, 44*a* and 46*a* remains current and accurate. In an exemplary embodiment, one or more of the steps 38*a*, 40*a*, 44*a* and 46*a* further include refreshing the received data with recent updates of the data from the aforementioned one or more data sources, issuing one or more queries for updated data from the one or more data sources, issuing one or more queries for updated data from the one or more data sources at predetermined time intervals such as, for example, every 45 seconds, issuing one or more queries for all of the data previously received in the steps 38*a*, 40*a*, 44*a* and 46*a*, issuing one or more queries for all of the data previously received in the steps 38*a*, 40*a*, 44*a* and 46*a* at predetermined time intervals such as, for example, every 45 seconds, and/or any combination thereof, automatically or otherwise.

In several exemplary embodiments, instead of, or in addition to giving spoken directives in the method, other types of directives are given in the steps 42*a*, 42*c*, 42*e*, 48*a*, 48*c*, 48*e* and 48*g* such as, for example, computer-executed directives, symbol directives, code directives, alerts, sounds, visual directives, audio directives, multimedia directives, etc.

In an exemplary embodiment, to display the airplane icons 78 (including the icon 96) in one or more of, for example, the steps 42*b*, 42*d*, 48*b*, 48*d*, 48*f* and 48*h* of the method 36, a map object method is used to manage and display the icons 78 on the touch-enable display 24*c* as part of the interface 50. More particularly, for every location that an airplane icon 78 can reside as part of the interface 50, there is a named object in a scalable vector graphics file (".svg file") at that location. Each of the objects has a name that includes the location, the object type, and the object status. The location of the naming standard for each of the objects indicates the airport followed by a specific location within the airport. For example, "DFWA26" is the location specified in the name for one of the objects, and indicates that the location is Gate 26 at Terminal A at Dallas-Fort Worth International Airport. The object type of the naming standard for each of the objects indicates the type of equipment represented by the object. For example, "aircraft" is the object type specified in the name for one of the objects, and indicates that the object is an airplane. The object status of the naming standard for each of the objects indicates the status of the equipment represented by the object. For example, "in" is the object status specified in the name for one of the objects that has "aircraft" as its object type, and indicates that the corresponding airplane 20 is actually stopped at one of the airline gates 18. For another example, "push straight back" is the object status specified in the name for one of the objects that has "aircraft" as its object type, and indicates that the corresponding airplane 20 has pushed back from one of the airline gates 18. For yet another example, "pushnorth" is the object status specified in the name for one of the objects that has "aircraft" as an object type, and indicates that the corresponding airplane has pushed back from one of the airline gates 18 and its tail direction is north. For still yet another example, "pushsouth" is the object status specified in the name for one of the objects that has "aircraft" as an object type, and indicates that the corresponding airplane has pushed back from one of the airline gates 18 and its tail direction is south.

Each of the objects uses the object attribute "visible" to visually represent and record the directive given. Each of the objects is either visible or invisible and its visibility is represented by a syntax such as, for example, "objectname.visible=TRUE", which indicates that the object identified by the specific "objectname" is visible, and objectname.visible=FALSE", which indicates that the object identified by the specific "objectname" is not visible. The specific "objectname" follows the above-described naming standard for the objects. For example, "DFWA26aircraftin" is an example of a specific "objectname".

In an exemplary embodiment, as illustrated in FIG. 12, the icon 96, which as noted above is one of the icons 78, is automatically displayed on the touch-enabled display 24*c* in its "in" status as part of the interface 50. To so display the icon 96, the object corresponding to the icon 96 shown in FIG. 12 has the specific "objectname" of "DFWA26aircraftin", and the object attribute is "DFWA26aircraftin.visible=TRUE". In contrast, all of the other objects for the interface 50 having "DFWA26" and "aircraft" in their names are invisible when the interface 50 is displayed as shown in FIG. 12, with such invisible objects including the objects having the names "DFWA26aircraftpushstraightback" and "DFWA26aircraftpushsouth" and further having the attributes "DFWA26aircraftpushstraightback.visible=FALSE" and "DFWA26aircraftpushsouth.visible=FALSE", respectively.

In an exemplary embodiment, as illustrated in FIG. 18, the icon 96, which as noted above is one of the icons 78, is automatically displayed on the touch-enabled display 24*c* in its "push straight back" status as part of the interface 50. To so display the icon 96, the object corresponding to the icon 96 shown in FIG. 18 has the specific "objectname" of "DFWA26aircraftpushstraightback", and the object attribute is "DFWA26aircraftpushstraightback.visible=TRUE". In contrast, all of the other objects for the interface 50 having "DFWA26" and "aircraft" in their names are invisible when the interface 50 is displayed as shown in FIG. 18, with such invisible objects including the objects having the names "DFWA26aircraftin" and "DFWA26aircraftpushsouth" and further having the attributes "DFWA26aircraftin.visible=FALSE" and "DFWA26aircraftpushsouth.visible=FALSE", respectively.

In an exemplary embodiment, as illustrated in FIG. 19, the icon 96, which as noted above is one of the icons 78, is automatically displayed on the touch-enabled display 24*c* in its "tail south" status as part of the interface 50. To so display the icon 96, the object corresponding to the icon 96 shown in FIG. 19 has the specific "objectname" of "DFWA26aircraftpushsouth", and the object attribute is "DFWA26aircraftpushsouth.visible=TRUE". In contrast, all of the other objects for the interface 50 having "DFWA26" and "aircraft" in their names are invisible when the interface 50 is displayed as shown in FIG. 19, with such invisible objects including the objects having the names "DFWA26aircraftin" and "DFWA26aircraftpushstraightback" and further having the attributes "DFWA26aircraftin.visible=FALSE" and "DFWA26aircraftpushstraightback.visible=FALSE", respectively.

In an exemplary embodiment, the map object method uses pre-defined functions to simply turn the visibility on or off for objects. For example, as illustrated in FIG. 18, as a result of the touching of the straight button 65, the object named DFWA26aircraftpushstraightback is automatically made visible, and the object named DFWA26aircraftin is automatically made invisible.

In several exemplary embodiments, the map object method simplifies the function of recording directives, making it indiscriminate across all airports. Moreover, the persistency view becomes simplified as a persistent database simply stores those objects for each airport and/or terminal thereof that are visible. This enables views of any airport and/or terminal thereof from any location of what objects are visible.

Figure 21:
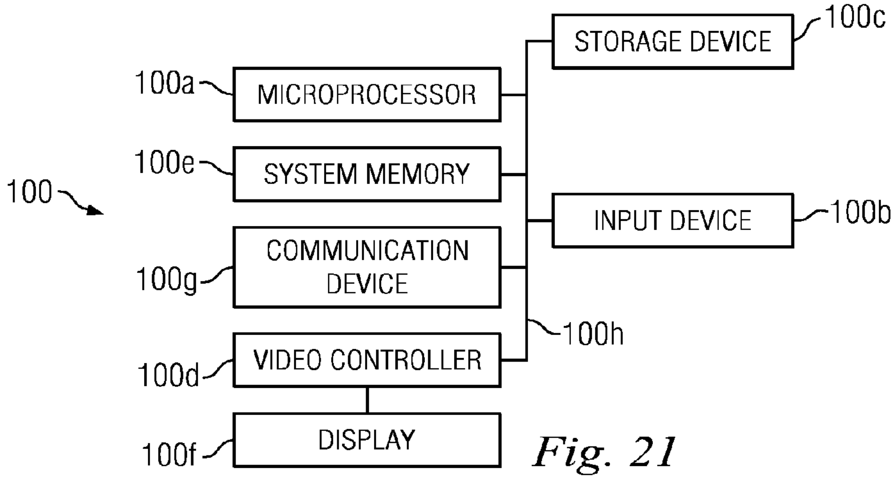
FIG. 21 is a diagrammatic illustration of a node for implementing one or more exemplary embodiments of the present disclosure, according to an exemplary embodiment.

In an exemplary embodiment, as illustrated in FIG. 21 with continuing reference to FIGS. 1-20, an illustrative node 100 for implementing one or more embodiments of one or more of the above-described networks, elements, methods and/or steps, and/or any combination thereof, is depicted. The node 100 includes a microprocessor 100*a*, an input device 100*b*, a storage device 100*c*, a video controller 100*d*, a system memory 100*e*, a display 100*f*, and a communication device 100*g* all interconnected by one or more buses 100*h*. In several exemplary embodiments, the storage device 100*c* may include a floppy drive, hard drive, CD-ROM, optical drive, any other form of storage device and/or any combination thereof. In several exemplary embodiments, the storage device 100*c* may include, and/or be capable of receiving, a floppy disk, CD-ROM, DVD-ROM, or any other form of computer-readable medium that may contain executable instructions. In several exemplary embodiments, the communication device 100*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the user device 24 and the module 30 is, or at least includes, the node 100 and/or components thereof, and/or one or more nodes that are substantially similar to the node 100 and/or components thereof. In several exemplary embodiments, one or more of the above-described components of one or more of the node 100, the user device 24, and the module 30, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 28, and/or one or more portions thereof, may be designed to work on any specific architecture. In an exemplary embodiment, one or more portions of the network 28 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, during the method 36, radar and/or GPS is used to confirm the location of the airplanes 20 and thus the locations of the icons 78 in the interface 50. In several exemplary embodiments, radar and/or GPS systems are operably coupled to the user device 24 and/or the module 30 and operate to confirm and/or control the locations of the icons 78 in the interface 50 in response to detections by the radar and/or GPS systems as to the actual locations of the airplanes 20 represented by the icons 78.

A method of providing a situational awareness of a status of a predetermined area with respect to a plurality of vehicles each of which is positioned within, or is expected to be positioned within, the predetermined area, has been described that includes recording respective directives associated with expected movements of the vehicles using multi-touch interaction with a display device, the expected movements resulting in expected changes in the position of each of the vehicles, wherein recording respective directives associated with the expected movements of the vehicles using multi-touch interaction with the display device includes touching the display device at a first location, touching the display device at a second location, and automatically displaying an icon on the display device in response to touching the display device at the second location, the icon representing one of the vehicles, the automatic display of the icon on the display device representing an expected position of the one of the vehicles after it has moved in accordance with the corresponding directive. In an exemplary embodiment, the method includes displaying a plurality of icons and/or indicators on the display device, each of the icons and/or indicators being associated with an inbound or outbound travel leg that is using, or is expected to use, one of the vehicles. In an exemplary embodiment, the method includes providing functional alerts for each of the vehicles, including automatically changing, as a function of time, the display of each of the first icons and/or indicators on the display device. In an exemplary embodiment, the vehicles are airplanes, the inbound or outbound travel leg is an inbound or outbound airline flight, and the predetermined area is at least partially defined by at least one airport taxiway and at least one airport terminal, the airport terminal including at least one airline gate. In an exemplary embodiment, the expected position of the one of the vehicles is associated with a tail direction of the corresponding airplane and/or a location within the predetermined area. In an exemplary embodiment, the location is selected from the group consisting of an entry location, a location proximate the airline gate, a first intermediate location between the entry location and the airline gate, a location offset from the airline gate, an exit location, and a second intermediate location between the location offset from the gate and the exit location.

A method of providing a situational awareness of a predetermined area has been described that includes receiving data associated with inbound and outbound travel legs from one or more data sources, each of the inbound and outbound travel legs using a vehicle that is positioned within, or is expected to be positioned within, the predetermined area; automatically displaying a plurality of first icons and/or indicators on a touch-enabled display device in response to receiving data associated with the inbound and outbound travel legs, the first icon and/or indicators being associated with respective ones of the inbound or outbound travel legs; and recording a directive for one of the inbound and outbound travel legs, including touching the display device at a first location at which one of the first icons and/or indicators is displayed, the one of the first icons and/or indicators being associated with the one of the inbound and outbound travel legs; touching the display device at a second location; and automatically displaying a second icon and/or indicator on the display device in response to touching the display device at the second location, the second icon and/or indicator being displayed on the display device at a location thereon that represents an expected position, within the predetermined area, of the vehicle being used by the one of the inbound and outbound travel legs after the vehicle has moved in accordance with the directive, thereby recording the directive. In an exemplary embodiment, the inbound and outbound travel legs are inbound and outbound airline flights, respectively; the vehicles are airplanes, and the predetermined area is at least partially defined by at least one airport taxiway and at least one airport terminal, the airport terminal including at least one airport gate. In an exemplary embodiment, the plurality of first icons and/or indicators includes a plurality of the first indicators, the first indicators being associated with respective ones of the inbound airline flights; and a plurality of the first icons, the first icons being associated with respective ones of the outbound airline flights. In an exemplary embodiment, the one of the inbound and outbound travel legs is one of the inbound airline flights; wherein the first location on the display device is the location at which the first indicator associated with the one of the inbound airline flights is displayed; and wherein the second location on the display device is the same as the location on the display device that represents the expected position of the airplane being used by the one of the inbound airline flights, the expected position being a location within the predetermined area at which the airplane enters the predetermined area. In an exemplary embodiment, the one of the inbound and outbound travel legs is one of the inbound airline flights; and wherein the second location on the display device is the same as the location on the display device that represents the expected position of the airplane being used by the one of the inbound airline flights, the expected position being a location proximate the airline gate. In an exemplary embodiment, the one of the inbound and outbound travel legs is one of the outbound airline flights; wherein the first location on the display device is the location at which the first icon associated with the one of the outbound airline flights is displayed; and wherein the second location on the display device is the same as the location on the display device that represents the expected position of the airplane being used by the one of the outbound airline flights, the expected position being a location offset from the airline gate and having a tail direction in accordance with the directive. In an exemplary embodiment, the one of the inbound and outbound travel legs is one of the outbound airline flights; and wherein the second location on the display device is the same as the location on the display device that represents the expected position of the airplane being used by the one of the outbound airline flights, the expected position being a location within the predetermined area at which the airplane exits the predetermined area. In an exemplary embodiment, the method includes providing functional alerts for each of the inbound and outbound travel legs, including automatically changing, as a function of time, the display of each of the first icons and/or indicators on the touch-enabled display device.

A computer readable medium has been described that includes a plurality of instructions stored therein, the plurality of instructions including instructions for receiving data associated with inbound and outbound travel legs from one or more data sources, each of the inbound and outbound travel legs using a vehicle that is positioned within, or is expected to be positioned within, the predetermined area; instructions for automatically displaying a plurality of first icons and/or indicators on a touch-enabled display device in response to receiving data associated with the inbound and outbound travel legs, the first icon and/or indicators being associated with respective ones of the inbound or outbound travel legs; and instructions for recording a directive for one of the inbound and outbound travel legs in response to multi-touch interaction with the display device at: a first location on the display device at which one of the first icons and/or indicators is displayed, the one of the first icons and/or indicators being associated with the one of the inbound and outbound travel legs; and a second location on the display device; wherein instructions for recording the directive for the one of the inbound and outbound travel legs include instructions for automatically displaying a second icon and/or indicator on the display device, the second icon and/or indicator being displayed on the display device at a location thereon that represents an expected position, within the predetermined area, of the vehicle being used by the one of the inbound and outbound travel legs after the vehicle has moved in accordance with the directive, thereby recording the directive. In an exemplary embodiment, the inbound and outbound travel legs are inbound and outbound airline flights, respectively; the vehicles are airplanes, and the predetermined area is at least partially defined by at least one airport taxiway and at least one airport terminal, the airport terminal including at least one airport gate. In an exemplary embodiment, the plurality of first icons and/or indicators includes a plurality of the first indicators, the first indicators being associated with respective ones of the inbound airline flights; and a plurality of the first icons, the first icons being associated with respective ones of the outbound airline flights. In an exemplary embodiment, the one of the inbound and outbound travel legs is one of the inbound airline flights; wherein the first location on the display device is the location at which the first indicator associated with the one of the inbound airline flights is displayed; and wherein the second location on the display device is the same as the location on the display device that represents the expected position of the airplane being used by the one of the inbound airline flights, the expected position being a location within the predetermined area at which the airplane enters the predetermined area. In an exemplary embodiment, the one of the inbound and outbound travel legs is one of the inbound airline flights; and wherein the second location on the display device is the same as the location on the display device that represents the expected position of the airplane being used by the one of the inbound airline flights, the expected position being a location proximate the airline gate. In an exemplary embodiment, the one of the inbound and outbound travel legs is one of the outbound airline flights; wherein the first location on the display device is the location at which the first icon associated with the one of the outbound airline flights is displayed; and wherein the second location on the display device is the same as the location on the display device that represents the expected position of the airplane being used by the one of the outbound airline flights, the expected position being a location offset from the airline gate and having a tail direction in accordance with the directive. In an exemplary embodiment, the one of the inbound and outbound travel legs is one of the outbound airline flights; and wherein the second location on the display device is the same as the location on the display device that represents the expected position of the airplane being used by the one of the outbound airline flights, the expected position being a location within the predetermined area at which the airplane exits the predetermined area. In an exemplary embodiment, the plurality of instructions further include instructions for providing functional alerts for each of the inbound and outbound travel legs, including instructions for automatically changing, as a function of time, the display of each of the first icons and/or indicators on the touch-enabled display device.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence (i.e., a plurality of airline flights), a leg of an airline sequence (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of providing a situational awareness of a status of a predetermined area with respect to a plurality of vehicles each of which is positioned within, or is expected to be positioned within, the predetermined area, the method comprising recording respective directives associated with expected movements of the vehicles using multi-touch interaction with a display device, the expected movements resulting in expected changes in the position of each of the vehicles, wherein recording respective directives associated with the expected movements of the vehicles using multi-touch interaction with the display device comprises touching the display device at a first location, touching the display device at a second location, and automatically displaying an icon on the display device in response to touching the display device at the second location, the icon representing one of the vehicles, the automatic display of the icon on the display device representing an expected position of the one of the vehicles after it has moved in accordance with the corresponding directive.

2. The method of claim 1, further comprising displaying a plurality of icons and/or indicators on the display device, each of the icons and/or indicators being associated with an inbound or outbound travel leg that is using, or is expected to use, one of the vehicles.

3. The method of claim 2, further comprising providing functional alerts for each of the vehicles, comprising automatically changing, as a function of time, the display of each of the icons and/or indicators on the display device.

4. The method of claim 2, wherein: the vehicles are airplanes, the inbound or outbound travel leg is an inbound or outbound airline flight, and the predetermined area is at least partially defined by at least one airport taxiway and at least one airport terminal, the airport terminal comprising at least one airline gate.

5. The method of claim 4, wherein the expected position of the one of the vehicles is associated with a tail direction of the corresponding airplane and/or a location within the predetermined area.

6. The method of claim 5, wherein the location is selected from the group consisting of an entry location, a location proximate the airline gate, a first intermediate location between the entry location and the airline gate, a location offset from the airline gate, an exit location, and a second intermediate location between the location offset from the gate and the exit location.

7. A method of providing a situational awareness of a predetermined area, the method comprising:

receiving data associated with inbound and outbound travel legs from one or more data sources, each of the inbound and outbound travel legs using a vehicle that is positioned within, or is expected to be positioned within, the predetermined area;

automatically displaying a plurality of first icons and/or indicators on a touch-enabled display device in response to receiving data associated with the inbound and outbound travel legs, the first icon and/or indicators being associated with respective ones of the inbound or outbound travel legs; and recording a directive for one of the inbound and outbound travel legs, comprising:

touching the display device at a first location at which one of the first icons and/or indicators is displayed, the one of the first icons and/or indicators being associated with the one of the inbound and outbound travel legs;

touching the display device at a second location; and automatically displaying a second icon and/or indicator on the display device in response to touching the display device at the second location, the second icon and/or indicator being displayed on the display device at a location thereon that represents an expected position, within the predetermined area, of the vehicle being used by the one of the inbound and outbound travel legs after the vehicle has moved in accordance with the directive, thereby recording the directive.

8. The method of claim 7, wherein:

the inbound and outbound travel legs are inbound and outbound airline flights, respectively;

the vehicles are airplanes, and the predetermined area is at least partially defined by at least one airport taxiway and at least one airport terminal, the airport terminal comprising at least one airport gate.

9. The method of claim 8, wherein the plurality of first icons and/or indicators comprises:

a plurality of the first indicators, the first indicators being associated with respective ones of the inbound airline flights; and a plurality of the first icons, the first icons being associated with respective ones of the outbound airline flights.

10. The method of claim 9, wherein the one of the inbound and outbound travel legs is one of the inbound airline flights;

wherein the first location on the display device is the location at which the first indicator associated with the one of the inbound airline flights is displayed; and wherein the second location on the display device is the same as the location on the display device that represents the expected position of the airplane being used by the one of the inbound airline flights, the expected position being a location within the predetermined area at which the airplane enters the predetermined area.

11. The method of claim 9, wherein the one of the inbound and outbound travel legs is one of the inbound airline flights; and wherein the second location on the display device is the same as the location on the display device that represents the expected position of the airplane being used by the one of the inbound airline flights, the expected position being a location proximate the airline gate.

12. The method of claim 9, wherein the one of the inbound and outbound travel legs is one of the outbound airline flights;

wherein the first location on the display device is the location at which the first icon associated with the one of the outbound airline flights is displayed; and wherein the second location on the display device is the same as the location on the display device that represents the expected position of the airplane being used by the one of the outbound airline flights, the expected position being a location offset from the airline gate and having a tail direction in accordance with the directive.

13. The method of claim 9, wherein the one of the inbound and outbound travel legs is one of the outbound airline flights; and wherein the second location on the display device is the same as the location on the display device that represents the expected position of the airplane being used by the one of the outbound airline flights, the expected position being a location within the predetermined area at which the airplane exits the predetermined area.

14. The method of claim 7, further comprising:

providing functional alerts for each of the inbound and outbound travel legs, comprising automatically changing, as a function of time, the display of each of the first icons and/or indicators on the touch-enabled display device.

15. A non-transitory computer readable medium comprising a plurality of instructions stored therein, the plurality of instructions comprising:

instructions for receiving data associated with inbound and outbound travel legs from one or more data sources, each of the inbound and outbound travel legs using a vehicle that is positioned within, or is expected to be positioned within, the predetermined area;

instructions for automatically displaying a plurality of first icons and/or indicators on a touch-enabled display device in response to receiving data associated with the inbound and outbound travel legs, the first icon and/or indicators being associated with respective ones of the inbound or outbound travel legs; and instructions for recording a directive for one of the inbound and outbound travel legs in response to multi-touch interaction with the display device at:

a first location on the display device at which one of the first icons and/or indicators is displayed, the one of the first icons and/or indicators being associated with the one of the inbound and outbound travel legs; and a second location on the display device;

wherein instructions for recording the directive for the one of the inbound and outbound travel legs comprise instructions for automatically displaying a second icon and/or indicator on the display device, the second icon and/or indicator being displayed on the display device at a location thereon that represents an expected position, within the predetermined area, of the vehicle being used by the one of the inbound and outbound travel legs after the vehicle has moved in accordance with the directive, thereby recording the directive.

16. The non-transitory computer readable medium of claim 15, wherein:

the inbound and outbound travel legs are inbound and outbound airline flights, respectively;

the vehicles are airplanes, and the predetermined area is at least partially defined by at least one airport taxiway and at least one airport terminal, the airport terminal comprising at least one airport gate.

17. The non-transitory computer readable medium of claim 16, wherein the plurality of first icons and/or indicators comprises:

a plurality of the first indicators, the first indicators being associated with respective ones of the inbound airline flights; and a plurality of the first icons, the first icons being associated with respective ones of the outbound airline flights.

18. The non-transitory computer readable medium of claim 17, wherein the one of the inbound and outbound travel legs is one of the inbound airline flights;

wherein the first location on the display device is the location at which the first indicator associated with the one of the inbound airline flights is displayed; and wherein the second location on the display device is the same as the location on the display device that represents the expected position of the airplane being used by the one of the inbound airline flights, the expected position being a location within the predetermined area at which the airplane enters the predetermined area.

19. The non-transitory computer readable medium of claim 17, wherein the one of the inbound and outbound travel legs is one of the inbound airline flights; and wherein the second location on the display device is the same as the location on the display device that represents the expected position of the airplane being used by the one of the inbound airline flights, the expected position being a location proximate the airline gate.

20. The non-transitory computer readable medium of claim 17, wherein the one of the inbound and outbound travel legs is one of the outbound airline flights;

wherein the first location on the display device is the location at which the first icon associated with the one of the outbound airline flights is displayed; and wherein the second location on the display device is the same as the location on the display device that represents the expected position of the airplane being used by the one of the outbound airline flights, the expected position being a location offset from the airline gate and having a tail direction in accordance with the directive.

21. The non-transitory computer readable medium of claim 17, wherein the one of the inbound and outbound travel legs is one of the outbound airline flights; and wherein the second location on the display device is the same as the location on the display device that represents the expected position of the airplane being used by the one of the outbound airline flights, the expected position being a location within the predetermined area at which the airplane exits the predetermined area.

22. The non-transitory computer readable medium of claim 15, wherein the plurality of instructions further comprises:

instructions for providing functional alerts for each of the inbound and outbound travel legs, comprising instructions for automatically changing, as a function of time, the display of each of the first icons and/or indicators on the touch-enabled display device.

* * * * *